United States Patent
Yin et al.

(10) Patent No.: US 12,423,405 B2
(45) Date of Patent: Sep. 23, 2025

(54) TERMINAL ANTI-THEFT METHOD AND TERMINAL DEVICE

(71) Applicant: HONOR DEVICE CO., LTD., Shenzhen (CN)

(72) Inventors: Gaosheng Yin, Shenzhen (CN); Renpeng Li, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/282,150

(22) PCT Filed: Jan. 4, 2023

(86) PCT No.: PCT/CN2023/070550
§ 371 (c)(1),
(2) Date: Sep. 14, 2023

(87) PCT Pub. No.: WO2023/131209
PCT Pub. Date: Jul. 13, 2023

(65) Prior Publication Data
US 2024/0054208 A1  Feb. 15, 2024

(30) Foreign Application Priority Data
Jan. 10, 2022 (CN) .......................... 202210022827.7

(51) Int. Cl.
*G06F 21/78* (2013.01)
*G06F 21/45* (2013.01)
(Continued)

(52) U.S. Cl.
CPC .............. *G06F 21/45* (2013.01); *G06F 21/57* (2013.01); *G06F 21/78* (2013.01)

(58) Field of Classification Search
CPC .......... G06F 21/45; G06F 21/57; G06F 21/78; G06F 21/31; G06F 21/88; G06F 21/77; H04M 1/72463; H04M 1/67
See application file for complete search history.

(56) References Cited

U.S. PATENT DOCUMENTS 9,977,924 B2 *  5/2018  Liu .......................... G06F 21/70
10,231,124 B2 *  3/2019  Huang .................. H04W 12/37
(Continued)

FOREIGN PATENT DOCUMENTS

CN          102857913 A          1/2013
CN          103577733 A          2/2014
(Continued)

*Primary Examiner* — Amie C. Lin
(74) *Attorney, Agent, or Firm* — WOMBLE BOND DICKINSON (US) LLP

(57) ABSTRACT

This application provides a terminal anti-theft method and a terminal device. The method includes: The terminal device reads an anti-theft identifier if the terminal device is in a powered-on and running state, where the anti-theft identifier is stored in the secure storage chip; the terminal device reads a first account from the secure storage chip when the anti-theft identifier indicates that the terminal device is in a lost state, where the first account is an account associated with the terminal device; the terminal device obtains a second account, where the second account is an account that is currently logged-in on the terminal device; the terminal device determines whether the first account is consistent with the second account; and the terminal device displays a first interface if the first account is inconsistent with the second account, where the first interface indicates that the terminal device is locked.

20 Claims, 26 Drawing Sheets

(51) Int. Cl.
*G06F 21/57* (2013.01)
*G06F 21/88* (2013.01)

(56) References Cited

U.S. PATENT DOCUMENTS

2015/0242644 A1 8/2015 Sonasath
2018/0365453 A1* 12/2018 Hartway ................. G06F 21/31
2019/0268155 A1 8/2019 Guo

FOREIGN PATENT DOCUMENTS

| | | |
|---|---|---|
| CN | 103581404 A | 2/2014 |
| CN | 104021358 A | 9/2014 |
| CN | 106851623 A | 6/2017 |
| CN | 107613493 A | 1/2018 |
| CN | 107734176 A | 2/2018 |
| CN | 110598384 A | 12/2019 |
| CN | 110851881 A | 2/2020 |
| CN | 112334896 A | 2/2021 |
| WO | 2019061525 A1 | 4/2019 |

* cited by examiner

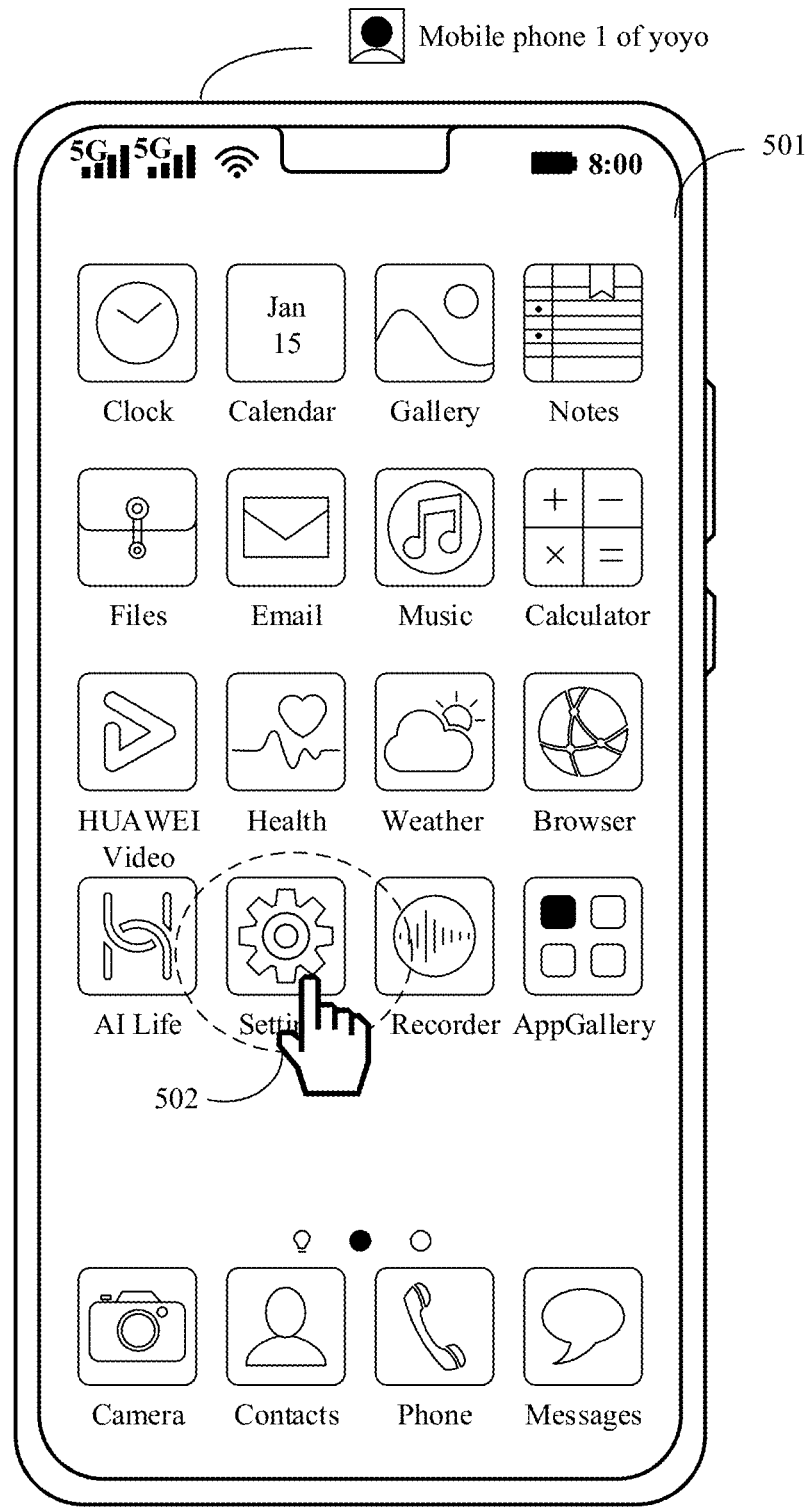
FIG. 5A(1)

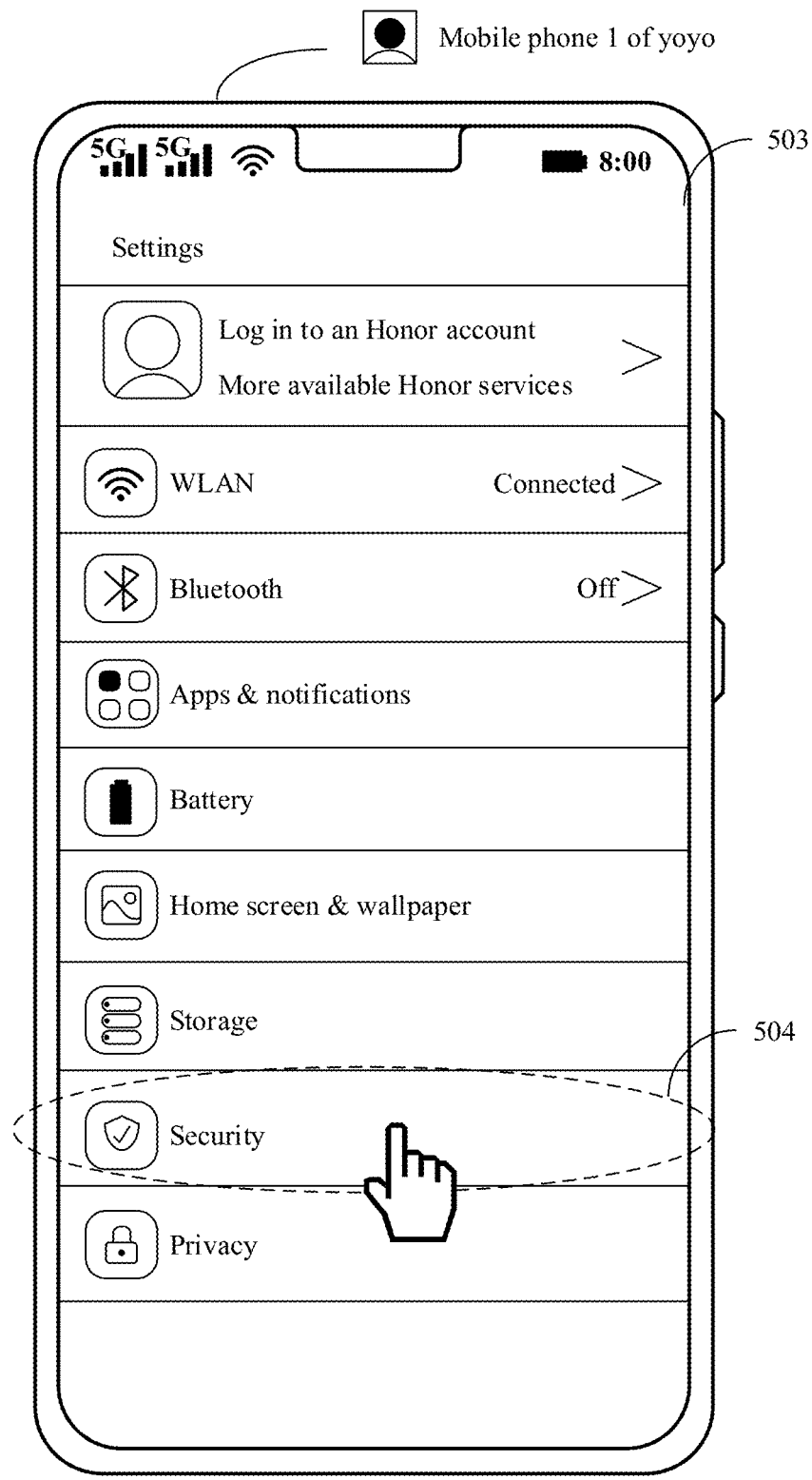
FIG. 5A(2)

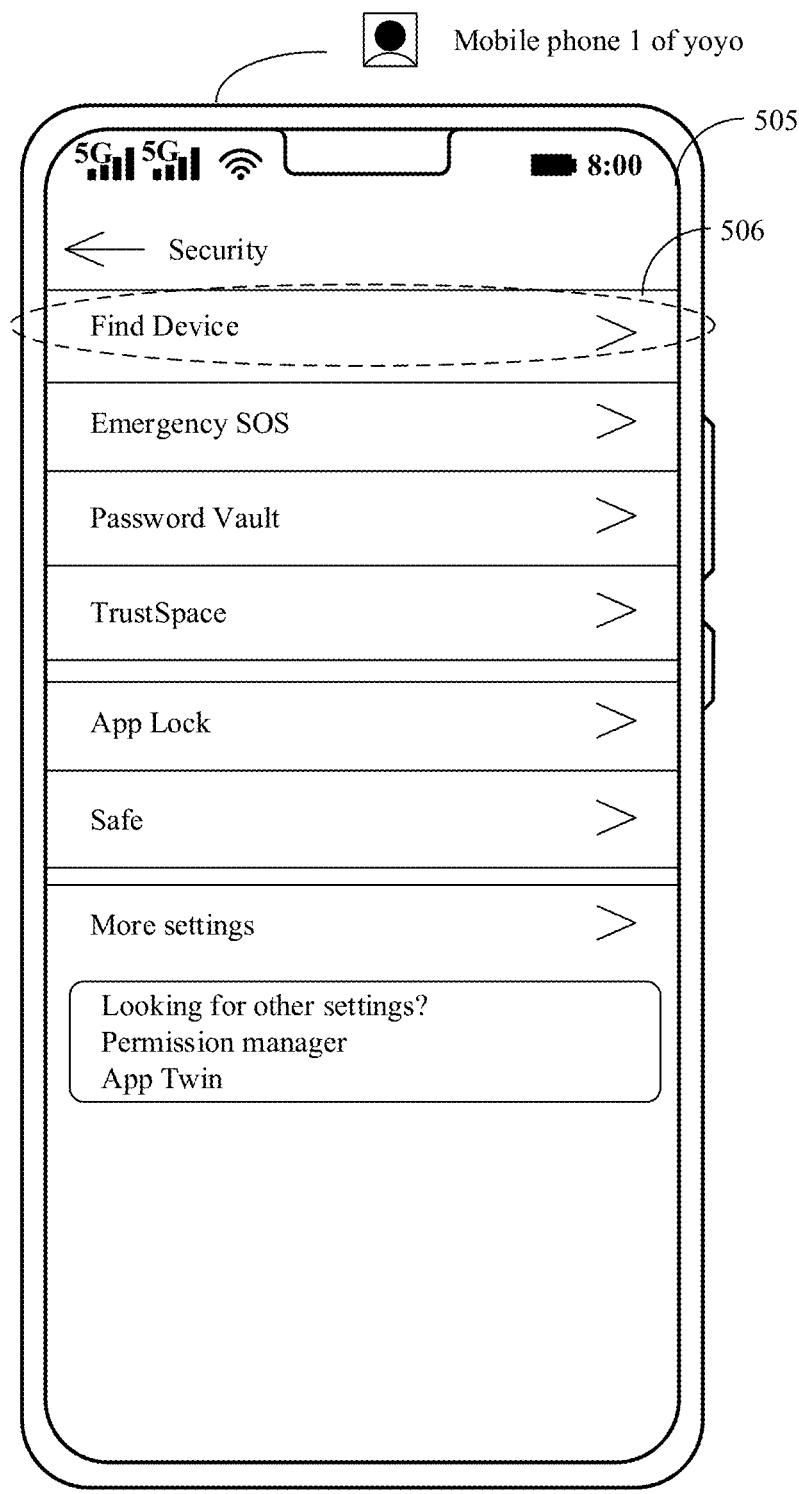
FIG. 5B(1)

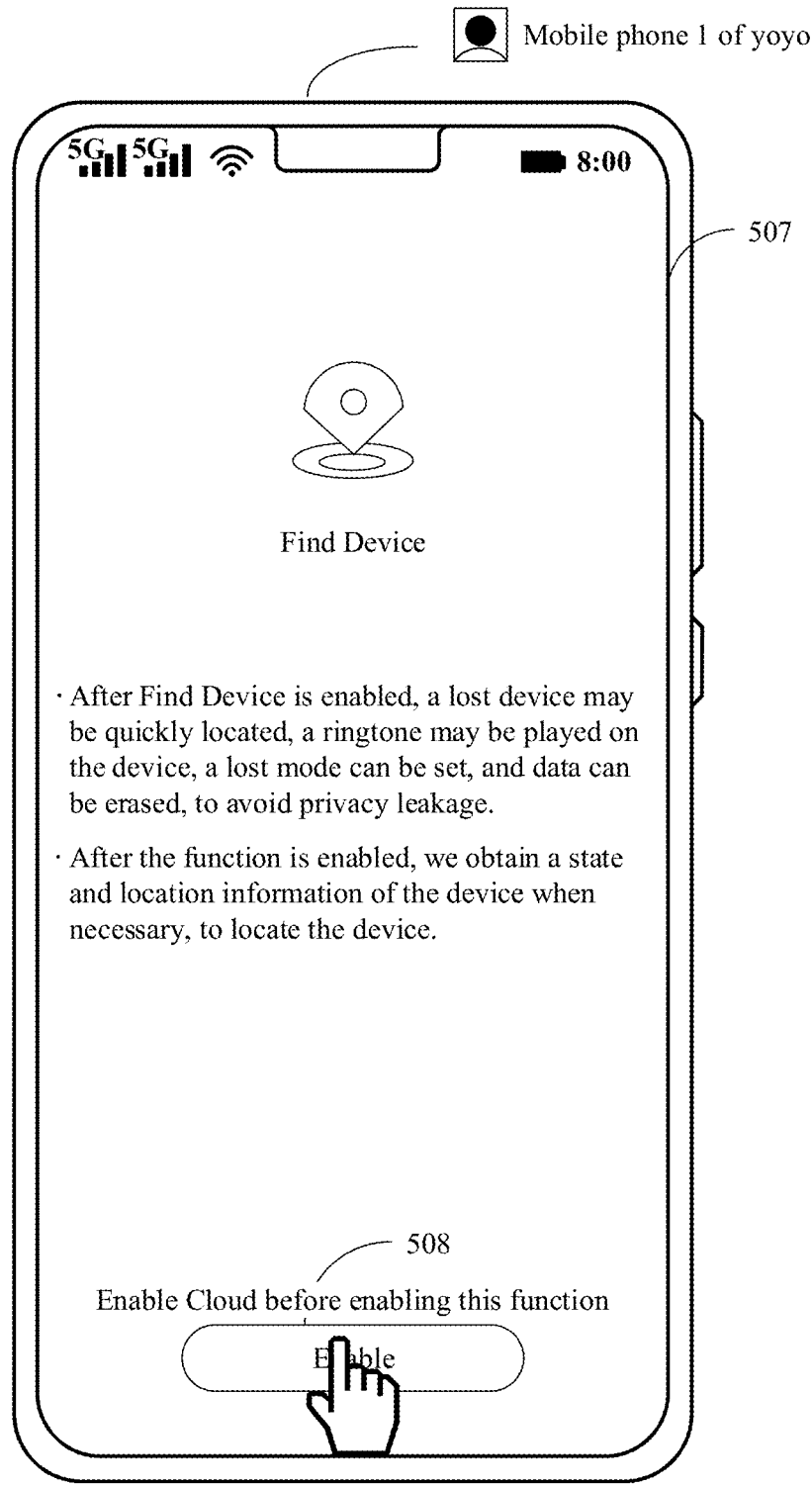
FIG. 5B(2)

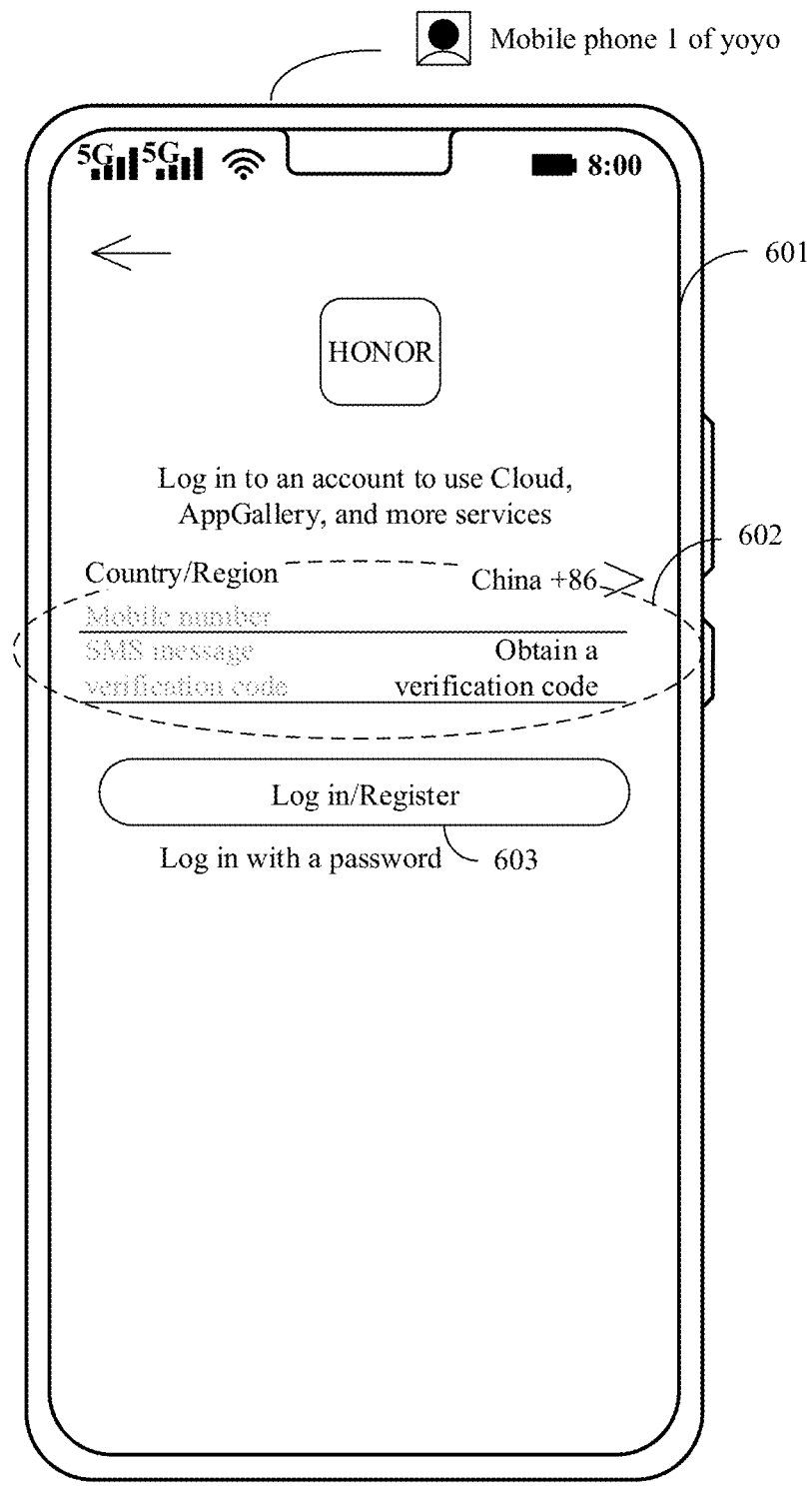
FIG. 5C(1)

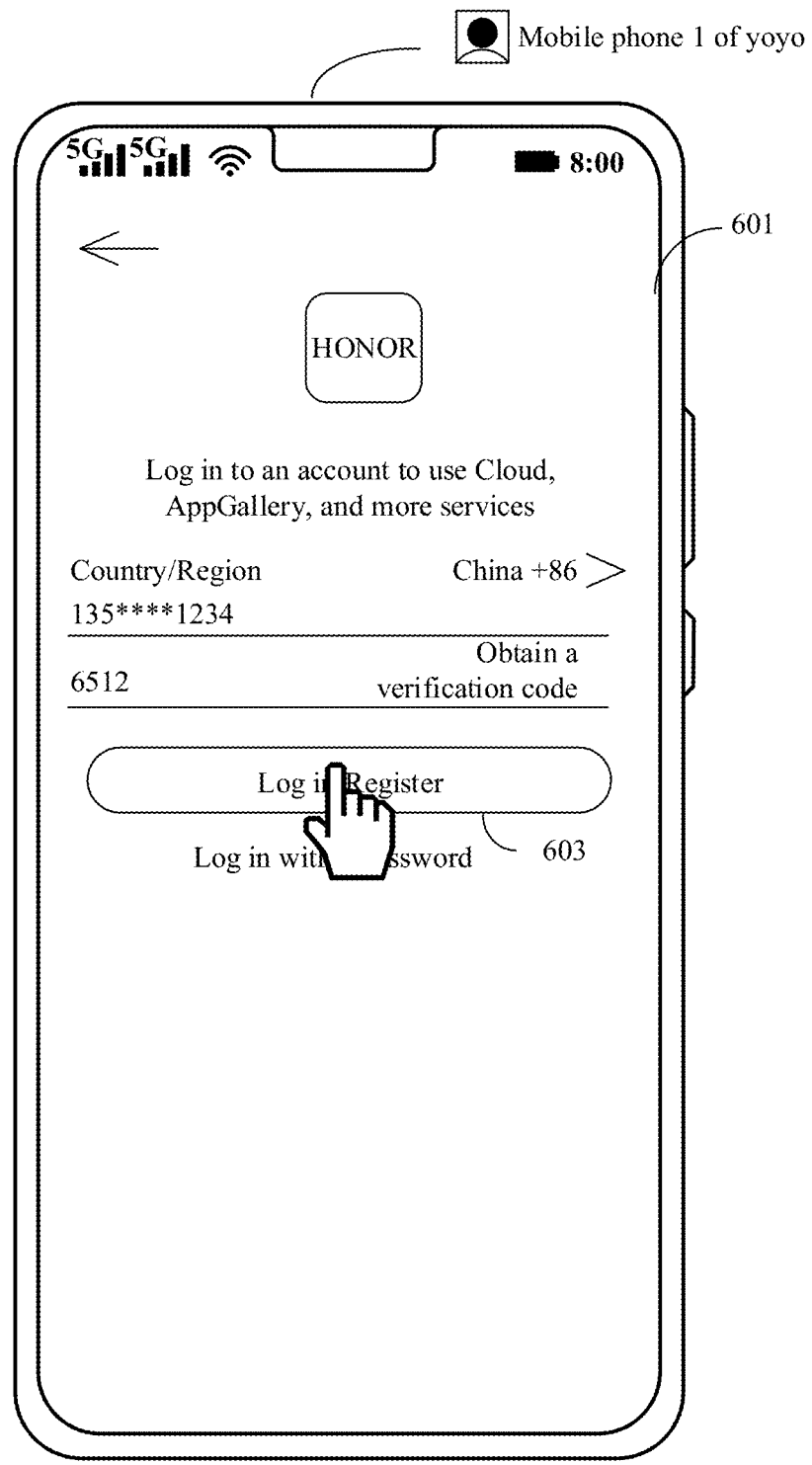
FIG. 5C(2)

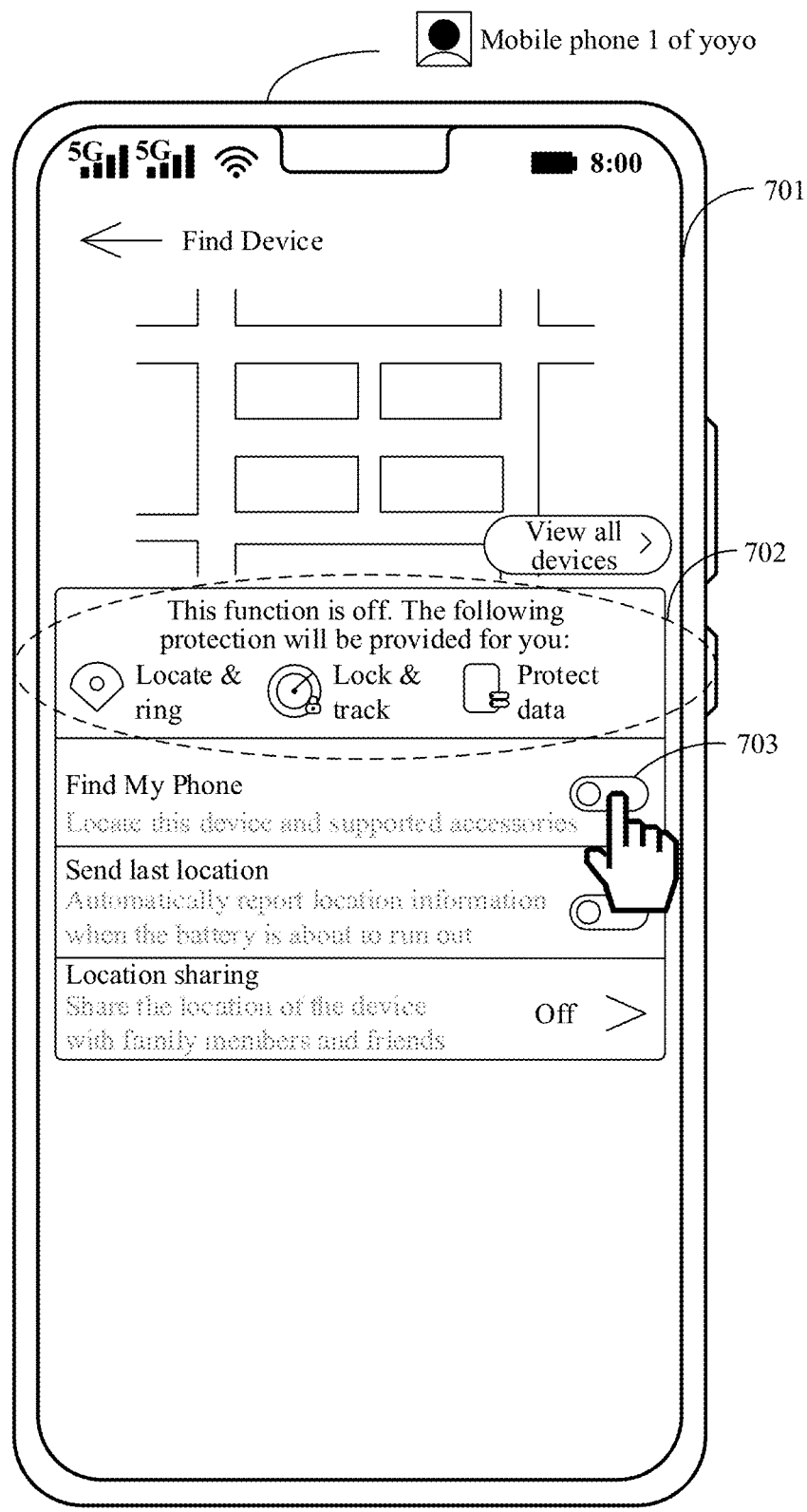
FIG. 5D(1)

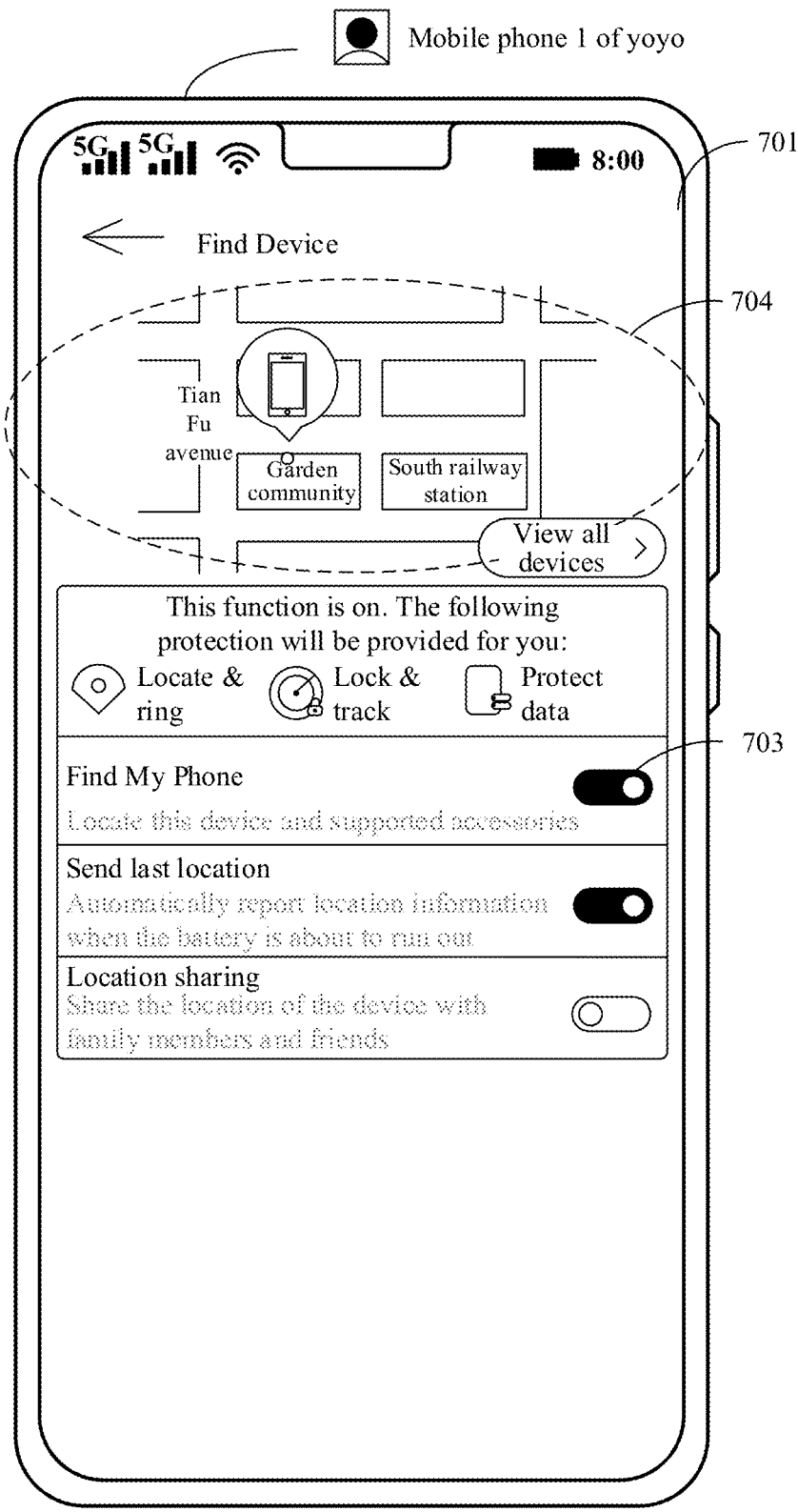
FIG. 5D(2)

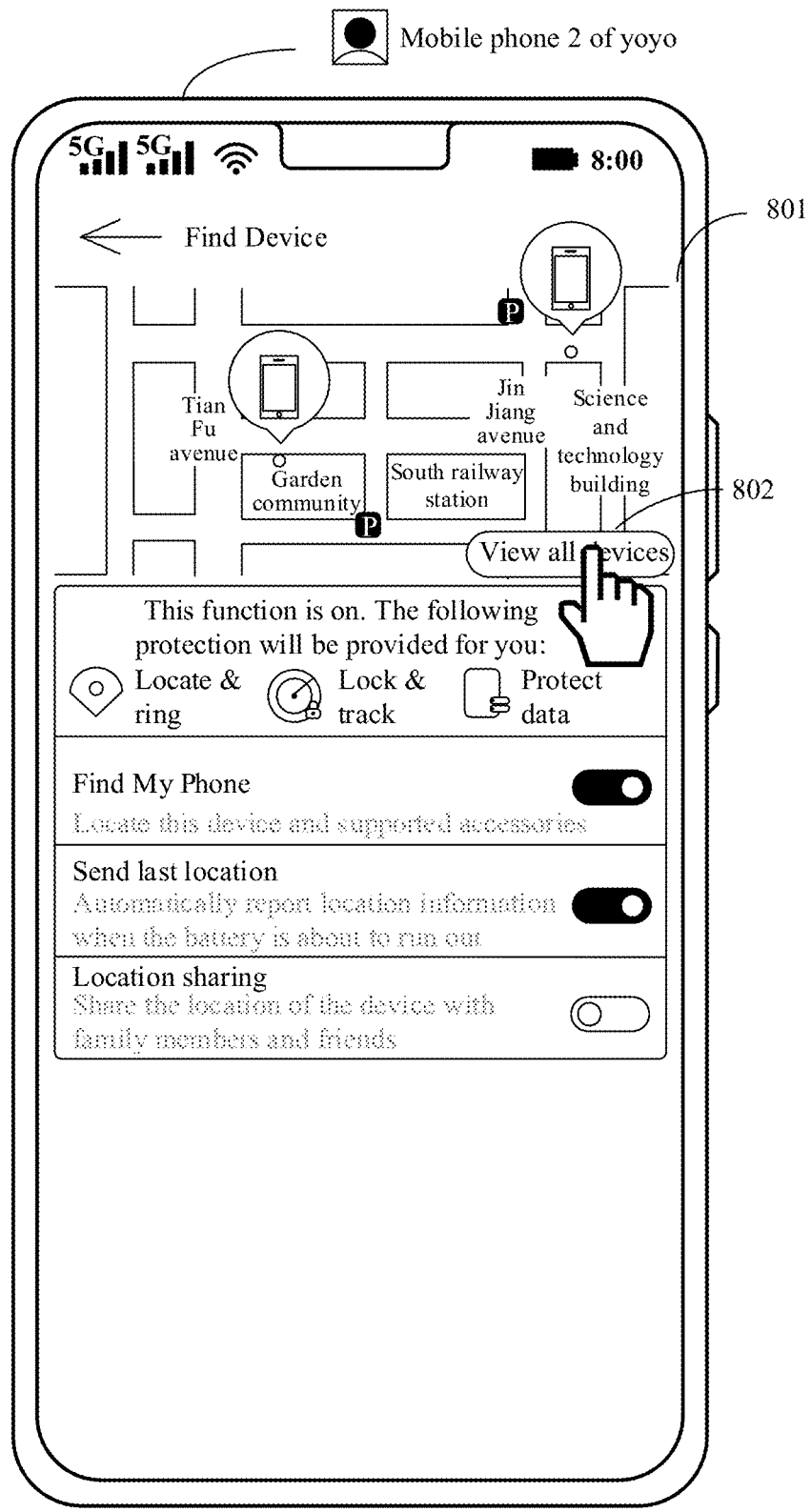
FIG. 6A(1)

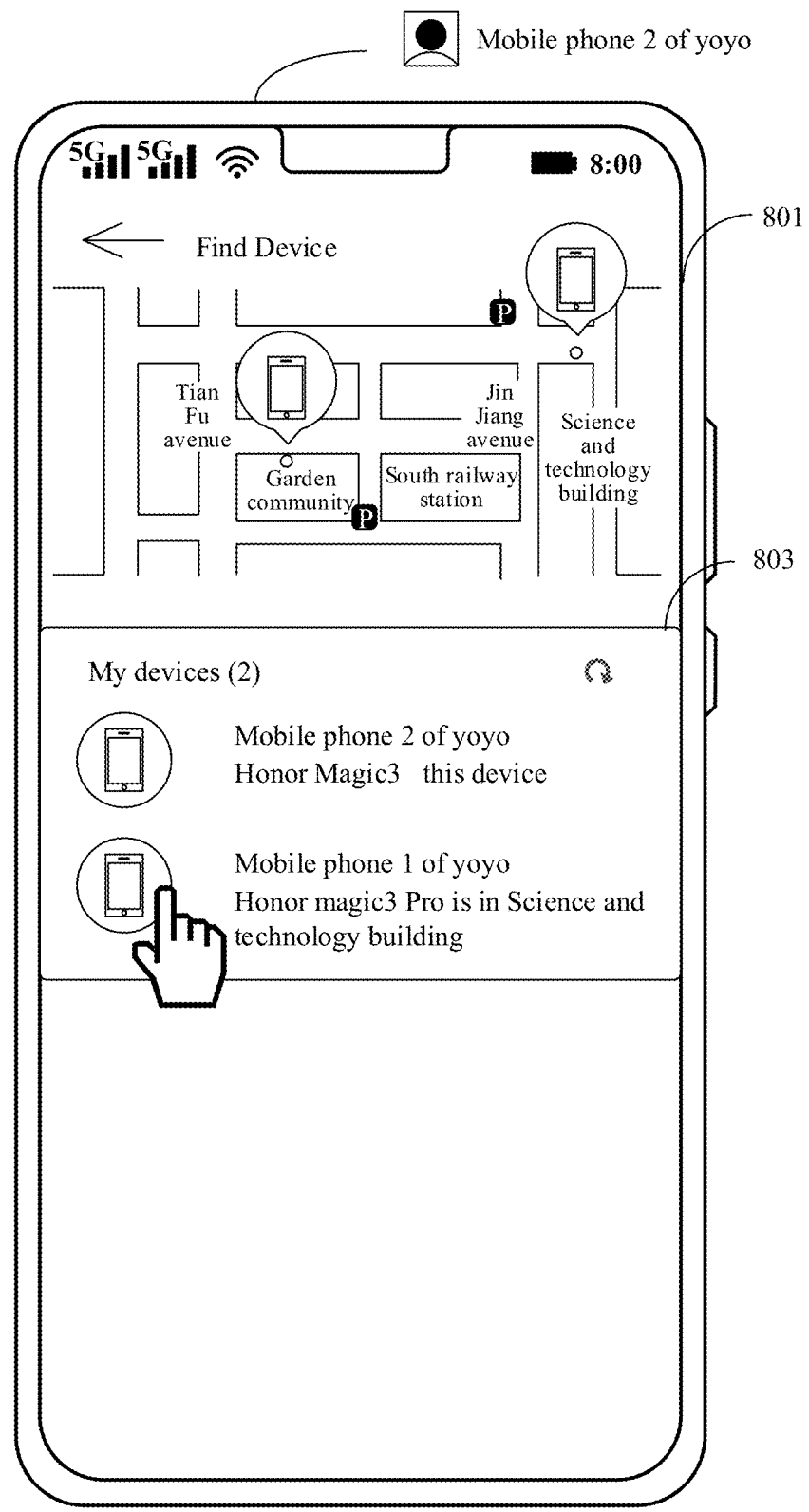
FIG. 6A(2)

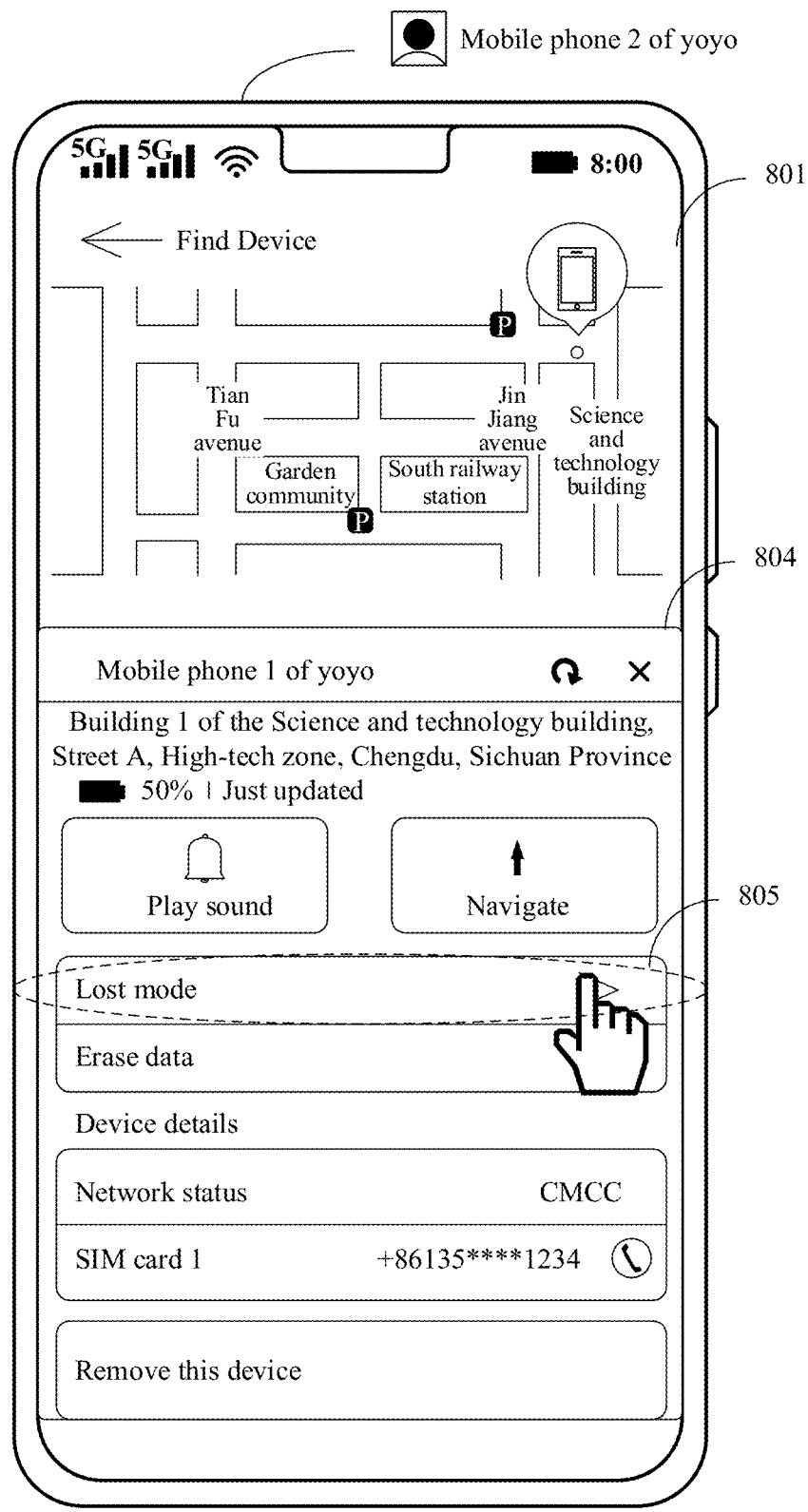
FIG. 6B(1)

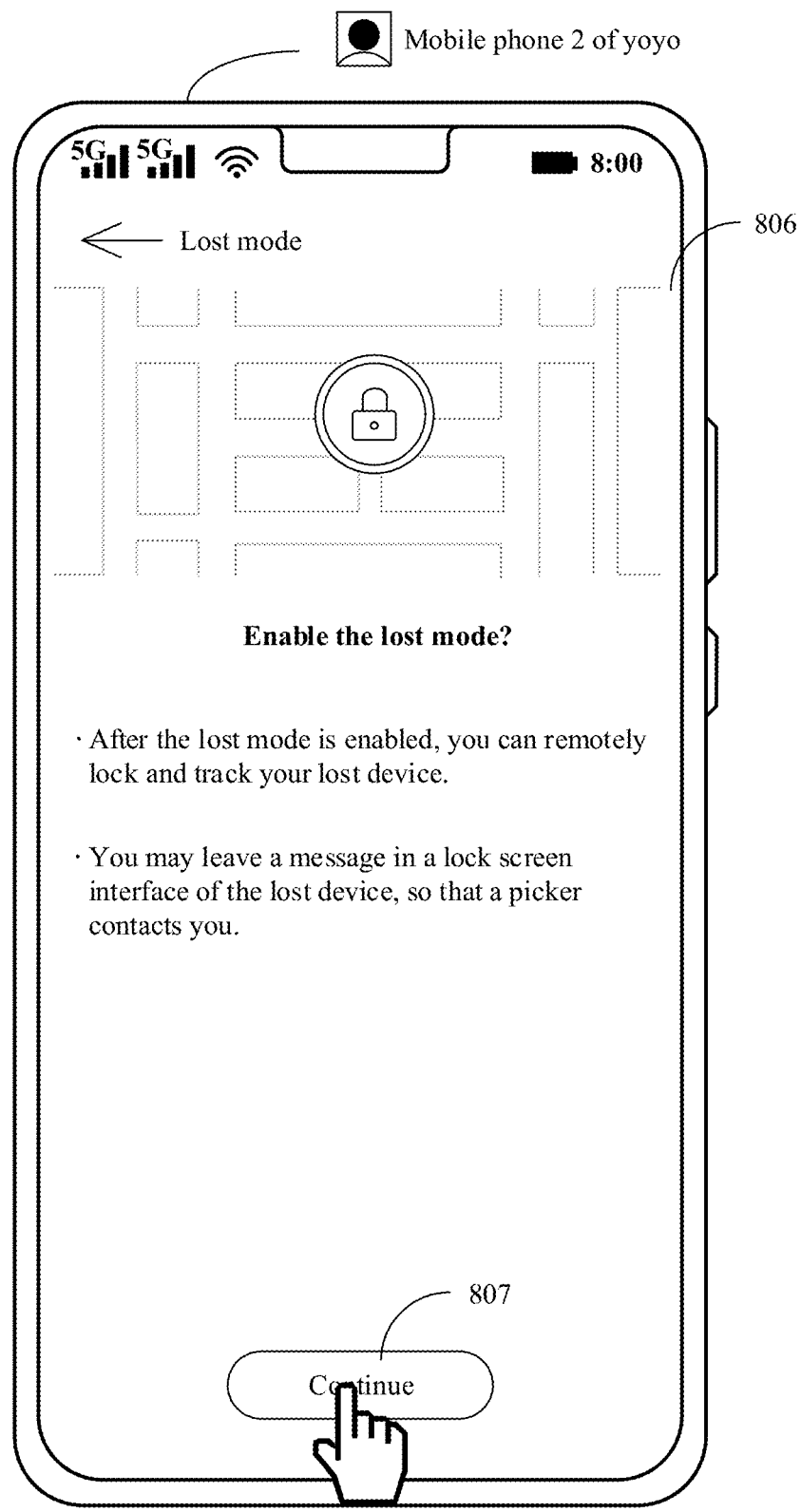
FIG. 6B(2)

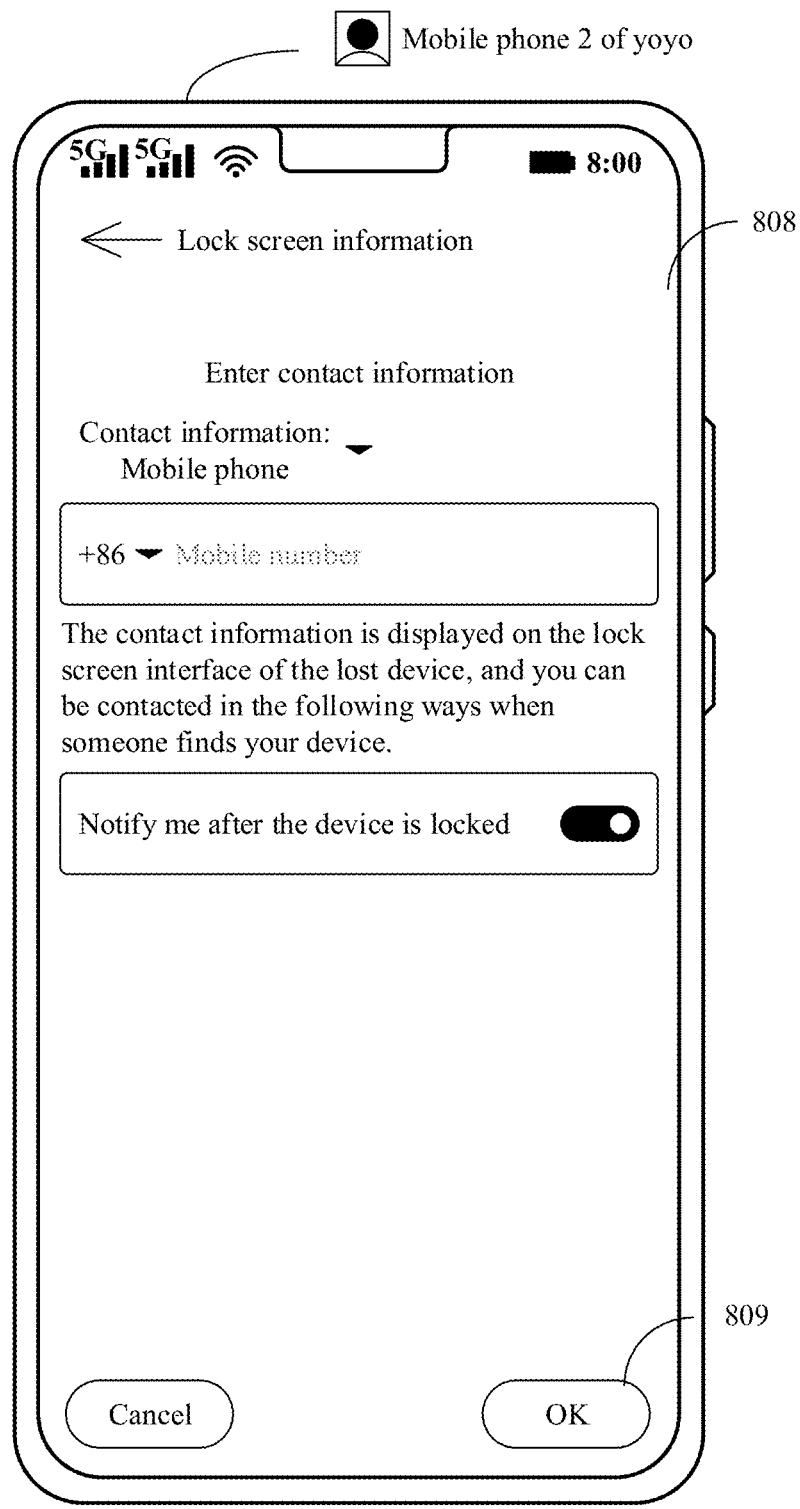
FIG. 6B(3)

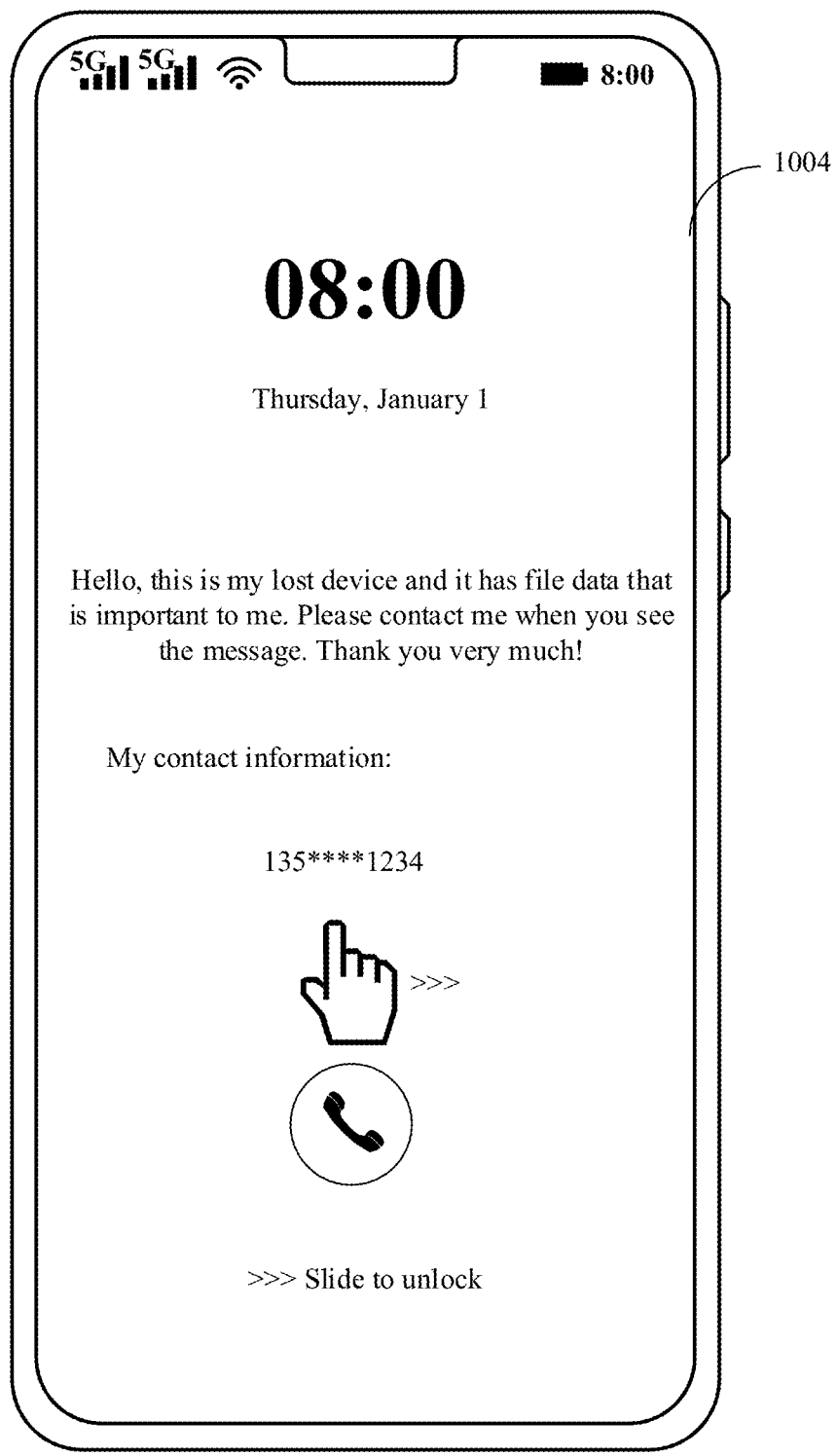
FIG. 10C(1)

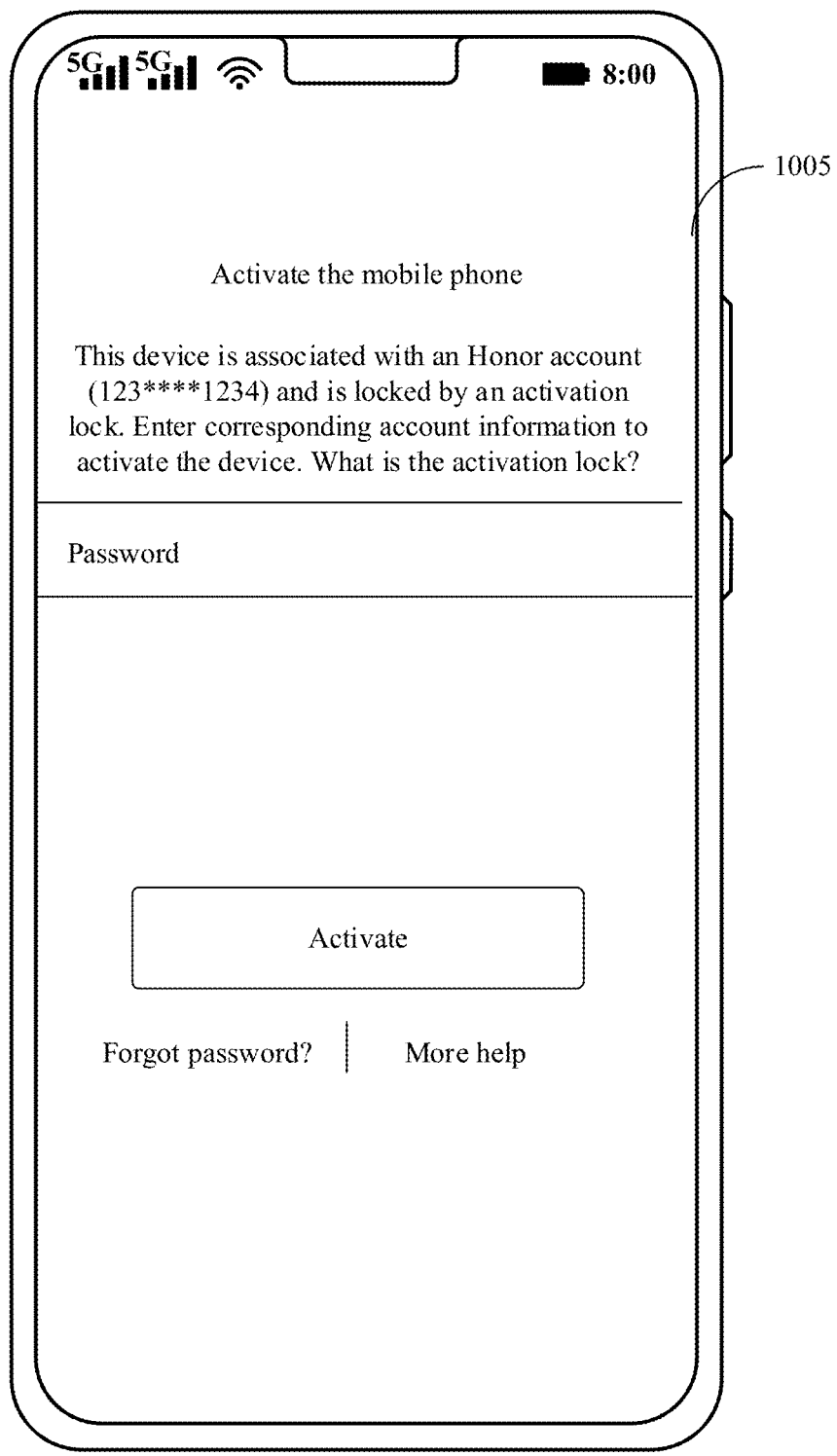
FIG. 10C(2)

TERMINAL ANTI-THEFT METHOD AND TERMINAL DEVICE

CROSS-REFERENCE TO RELATED APPLICATIONS

This application is a national stage of International Application No. PCT/CN2023/070550, filed on Jan. 4, 2023, which claims priority to Chinese Patent Application No. 202210022827.7, filed on Jan. 10, 2022. The disclosures of both of the aforementioned applications are hereby incorporated by reference in their entireties.

TECHNICAL FIELD

This application relates to the field of terminal technologies, and in particular, to a terminal anti-theft method and a terminal device.

BACKGROUND

With continuous development of science and technology, a terminal device (for example, a mobile phone or a tablet computer) plays a more important role in people's life. However, in daily life, the terminal device is lost or stolen sometimes. After the terminal device is lost or stolen, a picker or a thief may perform an operation such as ROM flashing on the terminal device to unlock the terminal device, and prevent an owner from finding the terminal device. Even worse, the thief may steal privacy information of the owner, resulting in privacy leakage of the owner.

Currently, a terminal manufacturer may set a factory reset protection (factory reset protection, FRP) lock or an activation lock (activation lock) in a boot wizard stage of a terminal, and verify a user identity by using the FRP lock or the activation lock. Once identity verification fails, the terminal cannot be activated, to prevent an unauthorized ROM flashing operation and achieve an anti-theft purpose. However, ROM flashing means emerge one after another. In some ROM flashing means, the boot wizard stage may be bypassed, to bypass identity verification. In some other ROM flashing means, an anti-theft identifier stored in the terminal may be erased or tampered with, so that a person performing unauthorized ROM flashing passes identity verification.

It can be learned that a current anti-theft method has a poor anti-theft effect.

SUMMARY

This application provides a terminal anti-theft method and a terminal device, to perform identity verification when the terminal device may be lost, and lock the terminal device when identity verification fails. In this case, a user cannot normally use the terminal device. Therefore, an anti-theft coefficient of the terminal device is increased.

To achieve the foregoing objective, the following technical solutions are used in this application:

According to a first aspect, this application provides a terminal anti-theft method, applied to a terminal device. The terminal device includes a secure storage chip, and the method includes: The terminal device reads an anti-theft identifier if the terminal device is in a powered-on and running state, where the anti-theft identifier is stored in the secure storage chip; the terminal device reads a first account from the secure storage chip when the anti-theft identifier indicates that the terminal device is in a lost state, where the first account is an account associated with the terminal device; the terminal device obtains a second account, where the second account is an account that is currently logged-in on the terminal device; the terminal device determines whether the first account is consistent with the second account; and the terminal device displays a first interface if the first account is inconsistent with the second account, where the first interface indicates that the terminal device is locked.

It can be learned that the terminal device may store the anti-theft identifier in the secure storage chip, and even if ROM flashing is performed on the terminal device, the anti-theft identifier is not erased. Therefore, the terminal device can always read the anti-theft identifier in the powered-on and running state, and perform identity verification based on the first account and the second account when the anti-theft identifier indicates that the terminal device may be lost. In this case, even if some terminal devices do not need to enter a boot wizard stage due to some ROM flashing means, identity verification may be performed after the terminal device is powered on. If a verification result is that verification fails (that is, the first account is inconsistent with the second account), the terminal device enters a locked state. In this case, a user cannot normally use the terminal device. Therefore, there is an anti-theft effect.

In an optional embodiment, that the terminal device reads an anti-theft identifier includes: The terminal device reads the anti-theft identifier in response to an operation that a user changes a lock screen password. It can be understood that, in consideration that most users set a lock screen password in a new device, and generally, the user seldom changes the lock screen password, when it is detected that the user changes the lock screen password, it may be considered that a user who uses the terminal device may change. In this case, whether the terminal device is in the lost state is verified, to not only achieve a verification purpose, but also reduce unnecessary verification.

In an optional embodiment, that the terminal device reads an anti-theft identifier includes: The terminal device reads the anti-theft identifier at a preset time interval. In consideration that the terminal device cannot learn, in advance, of an operation that may be performed by the user (for example, whether the user changes the lock screen password), the terminal device periodically reads the anti-theft identifier, to verify, in a timely manner, whether the terminal device is in the lost state. Once it is determined that the terminal device is in the lost state, a user identity needs to be verified, and the terminal device is locked when identity verification fails. In this way, an anti-theft coefficient of the terminal device is further increased.

In an optional embodiment, the method further includes: The terminal device reads the anti-theft identifier in response to that the terminal device enters a boot wizard. In other words, the terminal device may read the anti-theft identifier after entering the boot wizard, and perform identity verification in the boot wizard stage, to implement anti-theft in the boot wizard stage.

In an optional embodiment, that the terminal device obtains a second account includes: The terminal device obtains a login identifier; the terminal device displays a second interface if the login identifier indicates that no account is logged-in on the terminal device; and the terminal device obtains the second account in response to an input operation of the user in the second interface. In other words, when the second account is not logged-in on the terminal device, the terminal device may provide the user with the second interface for logging in to the second account.

In an optional embodiment, the method further includes: The terminal device reads the second account if the login identifier indicates that an account is logged-in on the terminal device. In other words, when the second account is logged-in on the terminal device, the terminal device may directly read the second account.

In an optional embodiment, the method further includes: The terminal device displays a third interface in response to receiving an operation that the user slides the first interface. The third interface is used by the user to enter a password that matches the first account. In other words, after the terminal device enters the locked state, the user may slide the first interface, to enable the terminal device to display the third interface, and perform an unlocking (activation) operation in the third interface.

In an optional embodiment, the method further includes: The terminal device resets the anti-theft identifier if the first account is consistent with the second account. It can be understood that, if the first account is consistent with the second account, it may be considered that the user who uses the terminal device does not change, and the terminal device is not lost. Therefore, the terminal device may reset the anti-theft identifier.

In an optional embodiment, the anti-theft identifier includes a first identifier and a second identifier, the first identifier is used to indicate whether a first function of the terminal device is enabled, the first function is a function that the terminal device uploads positioning information to a cloud server in real time, and the second identifier is used to indicate whether the terminal device is set to a lost mode; and the terminal device is in a lost state if the first identifier indicates that the first function of the terminal device is enabled; or the terminal device is in a lost state if the first identifier indicates that the first function of the terminal device is enabled and the second identifier indicates that the terminal device is set to the lost mode.

According to a second aspect, an embodiment of this application provides a terminal device, including a secure storage chip and a processor. The processor is coupled to a memory, the memory stores program instructions, and when the program instructions stored in the memory are executed by the processor, the terminal device is enabled to implement the method according to any one of the first aspect and the optional embodiments of the first aspect.

According to a third aspect, an embodiment of this application provides a computer-readable storage medium, including computer instructions. When the computer instructions are run on a terminal device, the terminal device is enabled to perform the method according to any one of the first aspect and the optional embodiments of the first aspect.

According to a fourth aspect, this application provides a chip system. The chip system includes one or more interface circuits and one or more processors. The interface circuit and the processor are interconnected by using a line. The chip system may be applied to a terminal device that includes a communication module and a memory. The interface circuit may read instructions stored in the memory of the terminal device and send the instructions to the processor. When the instructions are executed by the processor, the terminal device is enabled to perform the method according to any one of the first aspect and the optional embodiments of the first aspect.

According to a fifth aspect, this application provides a computer program product. When the computer program product runs on a terminal device, the terminal device is enabled to perform the method according to any one of the first aspect and the optional embodiments of the first aspect.

It can be understood that the terminal device according to the second aspect, the computer storage medium according to the third aspect, the chip system according to the fourth aspect, and the computer program product according to the fifth aspect are all used to perform the corresponding method provided above. Therefore, for beneficial effects that can be achieved by the terminal device, the computer storage medium, the chip system, and the computer program product, refer to beneficial effects in the corresponding method provided above. Details are not described herein again.

BRIEF DESCRIPTION OF DRAWINGS

FIG. 5A(1) and FIG. 5A(2)-FIG. 5D(1) and FIG. 5D(2) are diagrams of a group of user interfaces according to this application;

FIG. 6A(1) and FIG. 6A(2)-FIG. 6B(1) to FIG. 6B(3) are diagrams of a group of user interfaces according to this application;

FIG. 10A-FIG. 10C(1) and FIG. 10C(2) are diagrams of a group of user interfaces according to this application.

DESCRIPTION OF EMBODIMENTS

Figure 1:
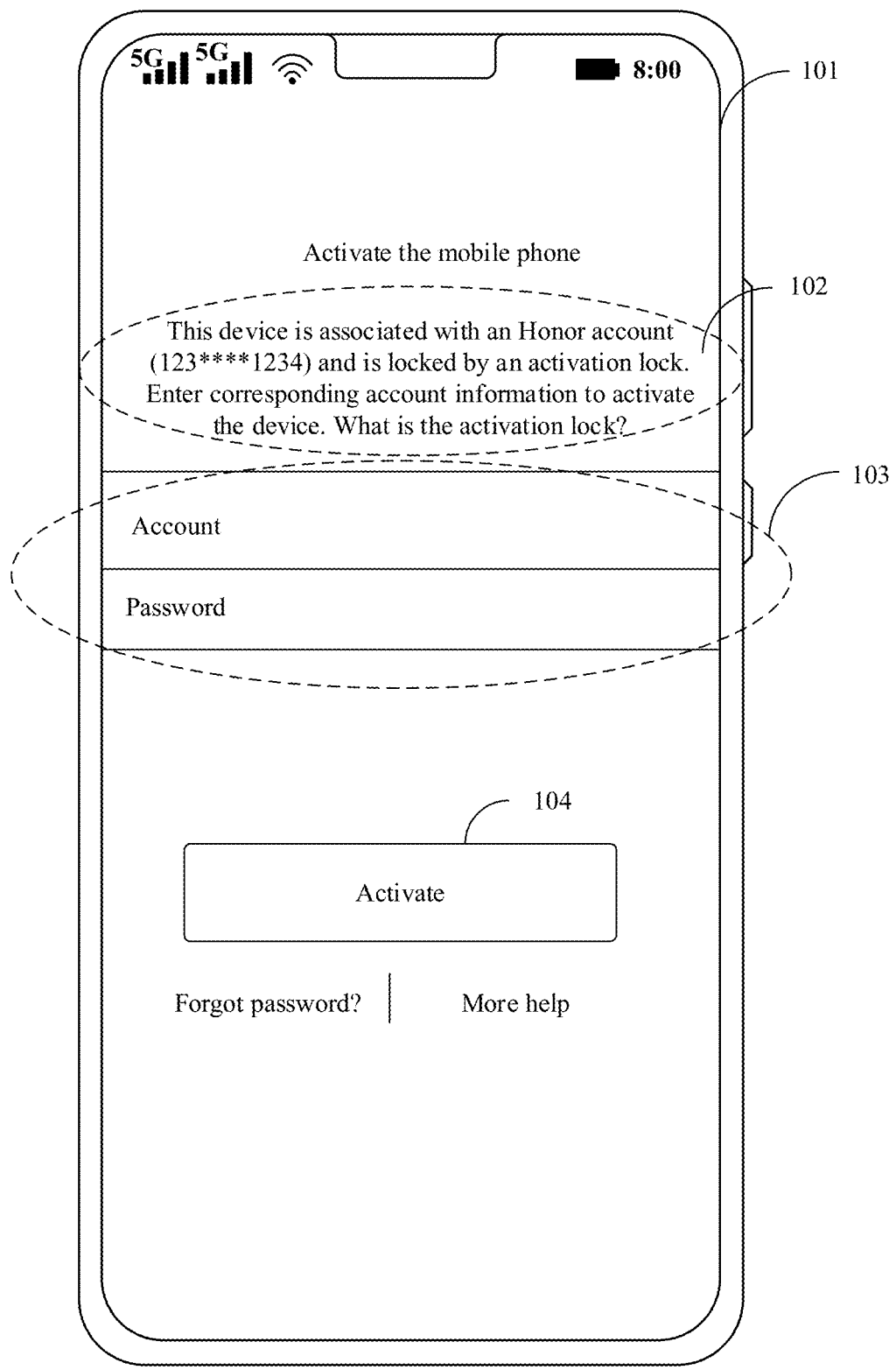
FIG. 1 is a diagram of a user interface according to this application.

The following terms "first" and "second" are used merely for the purpose of description, and shall not be construed as indicating or implying relative importance or implying a quantity of indicated technical features. Therefore, a feature defined as "first" or "second" may explicitly or implicitly include one or more of the features. In descriptions of the embodiments, unless otherwise stated, "a plurality of" means two or more.

To describe the following embodiments clearly and concisely and for ease of understanding by a person skilled in the art, related concepts or technologies are briefly described first.

A rich execution environment (rich execution environment, REE) may also be referred to as a common execution environment. The REE is usually a running environment without a specific security function, for example, an Android (Android) operating system or an IOS operating system. It should be noted that, in addition to being referred to as the "rich execution environment," the REE may also be referred to as an "untrusted execution environment," the "common execution environment," an "insecure execution environment," or the like. This is not limited in the embodiments of this application.

Trusted execution environment (trusted execution environment, TEE): The TEE is a running environment that coexists with the REE in an intelligent terminal. Based on hardware support, the TEE is isolated from the REE, has a security capability, and can resist a software attack that a conventional REE side is vulnerable to. The TEE has respective running space, and a strict protection measure is defined. Therefore, a security level of the TEE is higher than a security level of the REE, and assets (assets) such as data and software in the TEE can be protected from a software attack and a specific type of security threat. A client application (client application, CA) may run in the TEE.

A trusted application (trusted application, TA) is an application that runs in the TEE, and can provide, for a CA that runs outside the TEE, for example, security services such as entering a password, generating a transaction signature, and face recognition.

The CA is usually an application running in the REE. However, when some TAs invoke a TA, the TA that actively initiates invocation may also be used as a CA. The CA may invoke the TA through a client (Client) application programming interface (application programming interface, API) and indicate the TA to perform a corresponding secure operation.

A secure storage chip is a hardware unit with an independent processor and hardware attack prevention capability, can provide a secure running environment for an application that runs in the secure storage chip, and can ensure security and confidentiality of assets stored in the secure storage chip. Therefore, some important sensitive data, for example, data such as a lock screen password, a face template encryption key, and a fingerprint template encryption key, is all selected to be stored in the secure storage chip.

System on chip (system on chip, SoC): The SoC is an integrated circuit with a dedicated purpose, includes a complete system, and includes all content of embedded software. The SoC may be integrated with a central processing unit (central processing unit, CPU), a graphics processing unit (graphics processing unit, GPU), and the like of a terminal device.

After ROM flashing is performed on the terminal device or factory settings are restored, the terminal device directly enters a boot wizard when being powered on again. The boot wizard may be understood as a process in which the terminal device guides a user to set a system-related parameter (for example, a commonly used language, a text input method, or a network) based on a use habit of the user. Currently, a terminal manufacturer may set an FRP lock or an activation lock in the boot wizard of the terminal device, and verify a user identity by using the FRP lock or the activation lock, to increase an anti-theft coefficient of the terminal device. If identity verification fails, the terminal device cannot be normally powered on, to prevent an operation of unauthorized reinstallation of an operating system (commonly referred to as "ROM flashing").

Specifically, if the terminal device is powered on again when ROM flashing is performed on the terminal device or factory settings are restored, the terminal device may enter the boot wizard, and may read an anti-theft identifier. The anti-theft identifier may be used to indicate a state of a terminal. The state of the terminal device may include two types: a lost state (for example, the anti-theft identifier is 1) and a normal state (for example, the anti-theft identifier is 0). If the anti-theft identifier indicates that the terminal device is in the lost state, the terminal device may trigger the activation lock, and guide the user to enter account information to verify the user identity. For example, the terminal device may display an activation interface 101 shown in FIG. 1. The activation interface 101 includes prompt information 102, an input box 103, and an activation option 104. The prompt information 102 is used to notify that the device is associated with another account (for example, an Honor account 123****1234) and is locked by the activation lock, and the user needs to enter corresponding account information to activate the device. The input box 103 is used by the user to enter the account information. The account information may include an account number and a corresponding password. After entering the account information in the input box 103, the user may tap the activation option 104. The terminal device may receive an operation that the user taps the activation option 104. In response to the operation, the terminal device verifies whether the account information entered by the user matches preset account information. If the account information entered by the user matches the preset account information, a result indicating that verification succeeds may be obtained, and the terminal device is successfully activated, and may be normally powered on. If the account information entered by the user does not match the preset account information, a result indicating that verification fails is obtained, activation of the terminal device fails, and the terminal device cannot be normally powered on.

However, ROM flashing means emerge one after another. In some ROM flashing means, after ROM flashing is performed, the terminal device may be directly powered on, without a need to enter a boot wizard stage, to bypass identity verification. In some other ROM flashing means, the anti-theft identifier stored in the terminal device may be erased or tampered with. For example, a parameter of the anti-theft identifier may be changed to indicate that the terminal device is in the normal state. In this case, after the terminal device enters the boot wizard, the FRP lock and the activation lock does not need to be activated, and identity verification is bypassed. Consequently, an anti-theft effect is not achieved.

It can be learned that there is a poor anti-theft effect in the conventional technology.

Therefore, this application provides a terminal anti-theft method and a terminal device. A first account and an anti-theft identifier are stored in a secure storage chip, to reduce a risk that the terminal device does not perform identity verification because the first account and the anti-theft identifier are tampered with or erased, and further increase an anti-theft coefficient of the terminal device. The first account is an account that was once logged-in on the terminal device (which may be understood as a login account of an original user of the terminal device). The anti-theft identifier includes a service identifier (which may also be referred to as a first identifier) and a lost mode setting identifier (which may also be referred to as a second identifier). The service identifier is used to indicate whether a Find Device function (which may also be referred to as a first function) of the terminal device is enabled. The lost mode setting identifier is used to indicate whether the terminal device is in a lost mode. After the Find Device function is enabled, the terminal device may quickly locate the lost device to obtain positioning information, set the lost mode, and upload the positioning information to a cloud server in real time.

In addition, the terminal device may further read the anti-theft identifier from the secure storage chip, and read the first account from the secure storage chip when determining that the anti-theft identifier indicates that the terminal device may be lost. The terminal device may verify whether a second account is consistent with the first account. The second account is an account that is currently logged-in on the terminal device (which may be understood as a login account of a current user of the terminal device). If the first account is inconsistent with the second account, the terminal device enters a locked state, and the current user is restricted from continuing using the terminal device. It can be learned that, when the terminal device is powered on and runs, the terminal device may also read the anti-theft identifier and perform identity verification. In this case, even if ROM flashing is performed on the terminal device, the terminal device can be normally used only after identity verification succeeds, to further increase an anti-theft coefficient of the terminal device.

Figure 2:
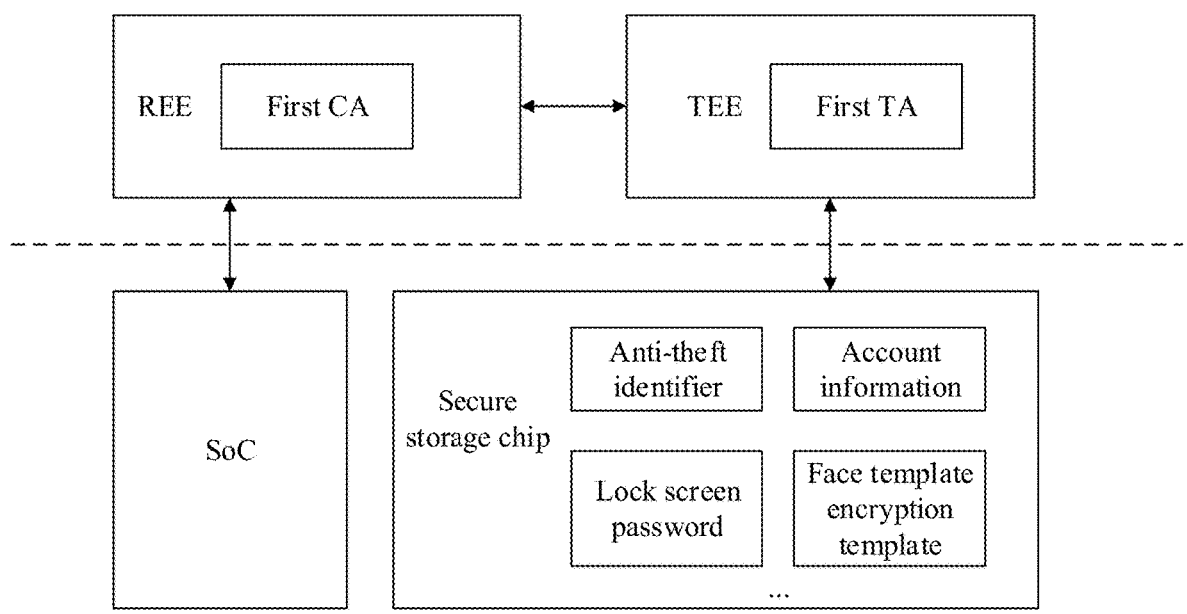
FIG. 2 is a diagram of a system architecture of a terminal device according to this application.

The terminal anti-theft method in the embodiments of this application may be applied to a system architecture shown in FIG. 2. As shown in FIG. 2, the system may include an REE, a TEE, a secure storage chip, and an SoC. The REE may separately communicate with the TEE and the SoC, and the TEE may communicate with the secure storage chip. The secure storage chip may be configured to store sensitive data such as a first account, an anti-theft identifier, and a lock screen password. A first CA may be deployed in the REE, and a first TA may be deployed in the TEE. The first CA may send, to the first TA, a request for reading the sensitive data such as the first account, the anti-theft identifier, and the lock screen password. The first TA may receive the request, read corresponding data from the secure storage chip, and feed back the corresponding data to the first CA.

It should be noted that, in the embodiments of this application, the system may further include more TEEs. For example, the TEE in FIG. 2 is used as a first TEE, and a virtual machine (virtual machine, VM) virtualized by using a hypervisor (which is also referred to as a (virtual machine monitor (virtual machine monitor, VMM)) is used as a second TEE.

The terminal device in the embodiments of this application may be any terminal device that supports the system architecture shown in FIG. 2. For example, the terminal device may be a device such as a mobile phone, a tablet computer, a desktop computer (desktop), a handheld computer, a notebook computer (laptop computer), an ultra-mobile personal computer (ultra-mobile personal computer, UMPC), a netbook, a personal digital assistant (personal digital assistant, PDA), or an augmented reality (augmented reality, AR)/virtual reality (virtual reality, VR) device. A specific form of the terminal device is not specifically limited in the embodiments of this application.

Figure 3:
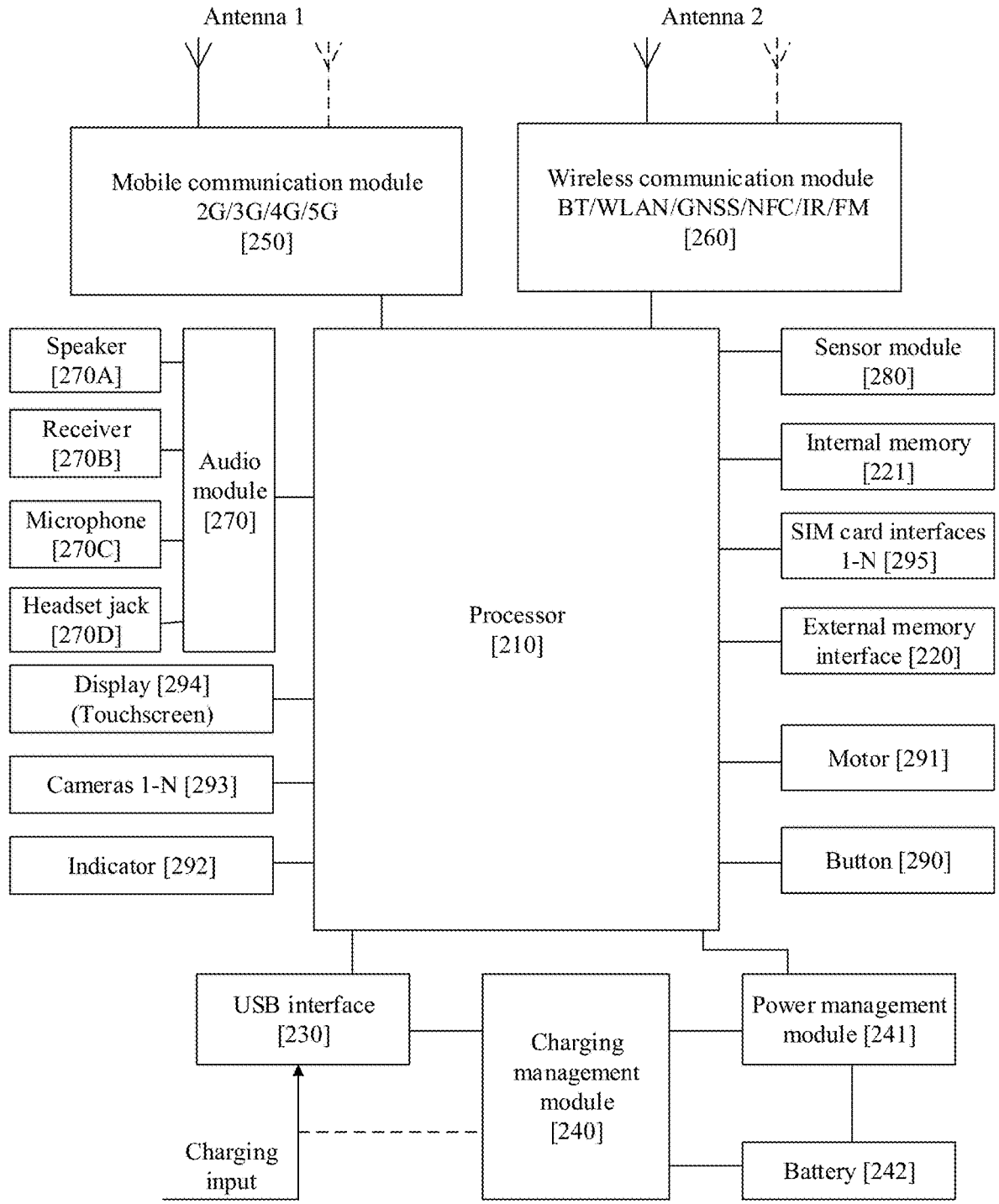
FIG. 3 is a schematic diagram of a structure of a terminal device according to this application.

The following describes, by using an example in which the terminal device is a mobile phone, a schematic diagram of a structure of a terminal device to which the embodiments of this application are applied. Referring to FIG. 3, a mobile phone 200 may include a processor 210, an external memory interface 220, an internal memory 221, a universal serial bus (universal serial bus, USB) interface 230, a charging management module 240, a power management module 241, a battery 242, an antenna 1, an antenna 2, a mobile communication module 250, a wireless communication module 260, an audio module 270, a speaker 270A, a receiver 270B, a microphone 270C, a headset jack 270D, a sensor module 280, a button 290, a motor 291, an indicator 292, a camera 293, a display 294, and a subscriber identification module (subscriber identification module, SIM) card interface 295, and the like.

The sensor module 280 may include sensors such as a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, and a bone conduction sensor.

It can be understood that the structure illustrated in the embodiments does not constitute a specific limitation on the mobile phone 200. In some other embodiments, the mobile phone 200 may include more or fewer components than those shown in the figure, or some components may be combined, or some components may be split, or components are arranged in different manners. The components shown in the figure may be implemented by hardware, software, or a combination of software and hardware.

The processor 210 may include one or more processing units. For example, the processor 210 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the mobile phone 200. The controller may generate an operation control signal based on instruction operation code and a time sequence signal, to complete control of instruction fetching and instruction execution.

A memory may be further disposed in the processor 210 to store instructions and data. In some embodiments, the memory in the processor 210 is a cache memory. The memory may store instructions or data that is just used or cyclically used by the processor 210. If the processor 210 needs to use the instructions or the data again, the processor 210 may directly invoke the instructions or the data from the memory. This avoids repeated access and reduces a waiting time of the processor 210, thereby improving system efficiency.

In some embodiments, the processor 210 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It can be understood that an interface connection relationship between the modules illustrated in the embodiments are merely illustrative descriptions, and does not constitute a limitation on a structure of the mobile phone 200. In some other embodiments, an interface connection manner different from that in the foregoing embodiment or a combination of a plurality of interface connection manners may be used for the mobile phone 200.

The charging management module 240 is configured to receive a charging input from a charger. The charger may be a wireless charger, or may be a wired charger. When charging the battery 242, the charging management module 240 may further supply power to the terminal device by using the power management module 241.

The power management module 241 is configured to be connected to the battery 242, the charging management module 240, and the processor 210. The power management module 241 receives an input from the battery 242 and/or the charging management module 240, to supply power to the processor 210, the internal memory 221, an external memory, the display 294, the camera 293, the wireless communication module 260, and the like. In some embodiments, the power management module 241 and the charging management module 240 may alternatively be disposed in a same device.

A wireless communication function of the mobile phone 200 may be implemented by using the antenna 1, the antenna 2, the mobile communication module 250, the wireless communication module 260, the modem processor, the baseband processor, and the like. In some embodiments, in the mobile phone 200, the antenna 1 is coupled to the mobile communication module 250, and the antenna 2 is coupled to the wireless communication module 260, so that the mobile phone 200 can communicate with a network and another device by using a wireless communication technology.

The antenna 1 and the antenna 2 are configured to transmit and receive an electromagnetic wave signal. Each antenna in the mobile phone 200 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 250 may provide a wireless communication solution such as 2G/3G/4G/5G applied to the mobile phone 200. The mobile communication module 250 may include at least one filter, at least one switch, at least one power amplifier, at least one low noise amplifier (low noise amplifier, LNA), and the like. The mobile communication module 250 may receive an electromagnetic wave through the antenna 1, perform processing such as filtering or amplification on the received electromagnetic wave, and send a processed electromagnetic wave to the modem processor for demodulation.

The mobile communication module 250 may further amplify a signal modulated by the modem processor, and convert the signal into an electromagnetic wave through the antenna 1 for radiation. In some embodiments, at least some functional modules of the mobile communication module 250 may be disposed in the processor 210. In some embodiments, at least some functional modules of the mobile communication module 250 and at least some modules of the processor 210 may be disposed in a same device.

The wireless communication module 260 may provide a wireless communication solution that is applied to the mobile phone 200, including a WLAN (for example, a (wireless fidelity, Wi-Fi) network), Bluetooth (bluetooth, BT), a global navigation satellite system (global navigation satellite system, GNSS), frequency modulation (frequency modulation, FM), a near field communication (near field communication, NFC) technology, an infrared (infrared, IR) technology, and the like.

The wireless communication module 260 may be one or more devices integrated with at least one communication processing module. The wireless communication module 260 receives an electromagnetic wave through the antenna 2, performs frequency modulation and filtering processing on the electromagnetic wave signal, and sends a processed signal to the processor 210. The wireless communication module 260 may further receive a to-be-sent signal from the processor 210, perform frequency modulation and amplification on the signal, and convert the signal into an electromagnetic wave through the antenna 2 for radiation.

The mobile phone 200 implements a display function by using a GPU, the display 294, an application processor, and the like. The GPU is a microprocessor for image processing, and connects the display 294 and the application processor. The GPU is configured to perform mathematical and geometrical calculation, and is configured to render graphics. The processor 210 may include one or more GPUs that execute program instructions to generate or change displayed information.

The display 294 is configured to display an image, a video, and the like. The display 294 includes a display panel.

The mobile phone 200 may implement a photographing function by using the ISP, the camera 293, the video codec, the GPU, the display 294, the application processor, and the like. The ISP is configured to process data fed back by the camera 293. The camera 293 is configured to capture a static image or a video. In some embodiments, the mobile phone 200 may include one or N cameras 293, where N is a positive integer greater than 1.

The external memory interface 220 may be configured to be connected to an external memory card, for example, a Micro SD card, to expand a storage capability of the mobile phone 200. The external memory card communicates with the processor 210 through the external memory interface 220 to implement a data storage function. For example, files such as music and a video are stored in the external memory card.

The internal memory 221 may be configured to store computer-executable program code. The executable program code includes instructions. The processor 210 runs the instructions stored in the internal memory 221, to perform various function applications and data processing of the mobile phone 200. For example, in the embodiments of this application, the processor 210 may execute the instructions stored in the internal memory 221, and the internal memory 221 may include a program storage area and a data storage area.

The program storage area may store an operating system, an application required by at least one function (for example, a sound playing function or an image playing function), and the like. The data storage area may store data (for example, audio data and a phone book) and the like created in a process of using the mobile phone 200. In addition, the internal memory 221 may include a high-speed random access memory, and may further include a nonvolatile memory such as at least one magnetic disk storage device, a flash memory device, or a universal flash storage (universal flash storage, UFS).

The mobile phone 200 may implement an audio function by using the audio module 270, the speaker 270A, the receiver 270B, the microphone 270C, the headset jack 270D, the application processor, and the like. The audio function includes, for example, music playing and recording.

The button 290 includes a power-on button, a volume button, or the like. The button 290 may be a mechanical button, or may be a touch button. The motor 291 may generate a vibration prompt. The motor 291 may be configured to provide a vibration prompt for an incoming call, and may also be configured to provide vibration feedback for touch. The indicator 292 may be an indicator light, and may be configured to indicate a charging state and a power change, or may be configured to indicate a message, a missed incoming call, a notification, or the like. The SIM card interface 295 is configured to be connected to an SIM card. The SIM card may be inserted into the SIM card interface 295 or plugged from the SIM card interface 295, to come into contact with or be separated from the mobile phone 200. The mobile phone 200 may support one or N SIM card interfaces, where N is a positive integer greater than 1. The SIM card interface 295 may support a Nano SIM card, a Micro SIM card, a SIM card, or the like.

Figure 4:
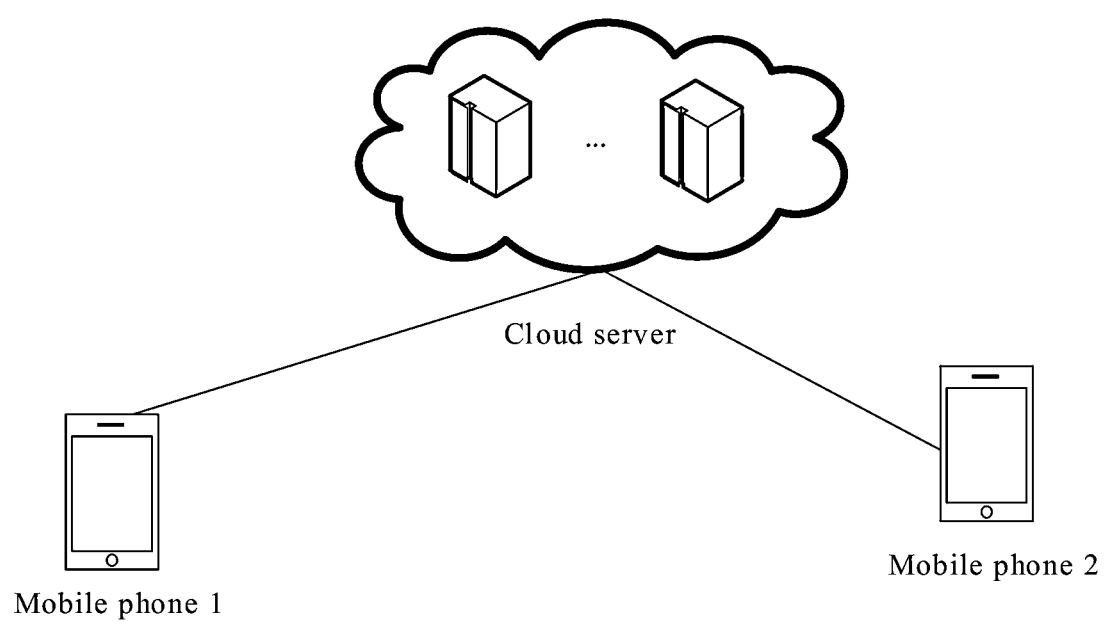
FIG. 4 is a diagram of an interaction scenario according to this application.

The following describes in detail a terminal anti-theft method provided in this application by using, as an example, a scenario in which a mobile phone 1 of yoyo (a Find Device function of the mobile phone 1 is enabled) is lost and the mobile phone 1 is searched for by using a mobile phone 2. As shown in FIG. 4, the mobile phone 1 and the mobile phone 2 are separately communicatively connected to a cloud server.

yoyo may enable the Find Device function of the mobile phone 1 in advance. After the Find Device function is enabled, the mobile phone may quickly locate a lost device, ring on the device, set a lost mode, and erase data, to avoid privacy leakage of a user. In addition, the mobile phone may further obtain a state and location information of the mobile phone, to locate the mobile phone. For example, yoyo may enable the Find Device function of the mobile phone 1 in interfaces shown in FIG. 5A(1) and FIG. 5A(2)-FIG. 5D(1) and FIG. 5D(2). As shown in FIG. 5A(1), the mobile phone 1 may display a home screen 501 (or a home screen), and the home screen 501 may include a settings option 502. The mobile phone 1 may receive a tap operation performed by the user on the settings option 502. In response to the operation, the mobile phone 1 may display a settings interface 503 shown in FIG. 5A(2). The settings interface 503 may include a plurality of settings options such as WLAN, Bluetooth, Battery, and Security 504. The mobile phone 1 may receive a tap operation performed by the user on the option of Security 504. In response to the operation, the mobile phone 1 may display an interface 505 shown in FIG. 5B(1). The interface 505 may include a plurality of settings options related to device security, for example, Find Device 506, Emergency SOS, and Password Vault. If the user wants to enable the Find Device function, the user may tap the option of Find Device 506. In response to the operation, as shown in FIG. 5B(2), the mobile phone 1 may display an interface 507. The interface 507 may include a related description of the Find Device function, and an option of Enable 508. The mobile phone 1 may receive an operation that the user taps the option of Enable 508. In response to the operation, the mobile phone 1 may display a login interface 601 shown in FIG. 5C(1). The login interface 601 includes an information input area 602 and a login option 603. As shown in FIG. 5C(2), the user may enter a login account (that is, a first account, for example, a mobile number "135**1234") and a verification code (for example, "6512") in the information input area 602, and then tap the login option 603. After receiving an operation that the user taps the login option 603, the mobile phone 1 may send the mobile number and the verification code to the cloud server, and the cloud server performs verification on the mobile number and the verification code. After verification performed by the cloud server succeeds, the cloud server may send, to the mobile phone 1, a message indicating that verification succeeds. The mobile phone 1 receives the message, and displays a Find Device interface 701 shown in FIG. 5D(1). The Find Device interface 701 may include status prompt information 702 and a Find My Phone option 703. The status prompt information 702 is used to indicate whether the Find Device function is enabled. For example, the status prompt information 702 shown in FIG. 5D(1) indicates that the Find Device function of the mobile phone 1 is not enabled. If the user wants to enable the Find Device function, the user may tap the Find My Phone option 703. After detecting the operation, the mobile phone may locate the mobile phone 1, and display, in the Find Device interface 701, a map 704 in which a specific location of the mobile phone 1 is marked (as shown in FIG. 5D(2)). It should be noted that, if the first account is logged-in on the mobile phone 1, when the mobile phone 1 receives an operation that the user taps Enable 508, a login process shown in FIG. 5C(1) and FIG. 5C(2) may be skipped, and the Find Device interface 701 shown in FIG. 5D(1)** is directly displayed.

After the Find Device function of the mobile phone 1 is enabled, the mobile phone 1 may set a service identifier to a state identifying that the Find Device function is enabled. In a possible design, the service identifier may be 0 or 1. If the service identifier is 0, it indicates that a Find Device function of a device is not enabled; or if the service identifier is 1, it indicates that a Find Device function of a device is enabled. Therefore, after the Find Device function of the mobile phone 1 is enabled, the mobile phone 1 may set the service identifier to 1, and send, to a first TA, a request for storing the service identifier and the first account. The first TA may receive the request, and write the service identifier and the first account into a secure storage chip, so that the secure storage chip stores the service identifier and the first account.

After the Find Device function is enabled, the mobile phone 1 may further obtain positioning information of the mobile phone 1, and upload the positioning information to the cloud server. The cloud server may receive the positioning information, and establish a binding relationship among the mobile phone 1, the positioning information, and the first account. Establishing the binding relationship among the mobile phone 1, the positioning information, and the first account may mean that the cloud server can find the positioning information of the mobile phone 1 by using the first account.

After determining that the mobile phone 1 is lost, yoyo may log in to the first account in the mobile phone 2, and set a state of the mobile phone 1 to the lost mode. For example, as shown in FIG. 6A(1), after the first account is logged-in on the mobile phone 2 of yoyo, the mobile phone 2 may display a Find Device interface 801. The Find Device interface 801 includes an option of View all devices 802. If the user wants to view all devices associated with the first account, the user may tap View all devices 802. After detecting an operation that the user taps View all devices 802, the mobile phone 2 may display a device list 803 in the Find Device interface 801 (as shown in FIG. 6A(2)). The device list 803 may display device information of all devices (for example, the mobile phone 1 and the mobile phone 2 of yoyo) bound to the first account. The device information may include a device name (for example, Mobile phone 1 of yoyo), a device model (for example, Honor magic3 Pro), location information (Science and technology building), and the like. The user may select, from all the devices included in the device list 803, a device (for example, Mobile phone 1 of yoyo) that needs to be controlled. In response to an operation that the user selects the mobile phone 1 of yoyo, the mobile phone 2 may display, in the Find Device interface 801, a control bar 804 shown in FIG. 6B(1). The control bar 804 may display a specific location (for example, Building 1 of the Science and technology building, Street A, High-tech zone, Chengdu, Sichuan Province) of the mobile phone 1, a power status, and a plurality of control options that may be used to control the mobile phone 1. The plurality of control options may include Lost mode 805, Play sound, Navigate, Erase data, and the like. The user may perform an operation of tapping Lost mode 805. In response to the operation, as shown in FIG. 6B(2), the mobile phone 2 may display an interface 806. The interface 806 includes a description of the lost mode. For example, after the lost mode is enabled, the user may remotely lock and track a lost device (for example, the mobile phone 1), and leave a message in a lock screen interface of the lost device, so that a picker contacts an owner. In addition, the interface 806 further includes a Continue option 807. The mobile phone 2 may receive an operation that the user taps the Continue option 807. In response to the operation, the mobile phone 2 may display a lock screen information settings interface 808 (as shown in FIG. 6B(3)). The lock screen information settings interface 808 is configured to display information such as a mobile number and a message in a lock screen interface of the mobile phone 1 after the mobile phone 1 enters the lost mode. The lock screen information interface 808 may include an OK option 809. After completing setting, the user may tap the OK option 809. After detecting that the user taps the OK option 809, the mobile phone 2 may send, to the cloud server, a request for setting the mobile phone 1 to the lost mode. The cloud server receives the request, and sends a state change message to the mobile phone 1 based on the first account. The mobile phone 1 receives the state change message, and sets a lost mode setting identifier to a state identifying that the lost mode is enabled. In a possible design, the lost mode setting identifier may be 0 or 1. If the lost mode setting identifier is 0, it indicates that the device does not enter a lost mode setting mode; or if the lost mode setting identifier is 1, it indicates that the device has entered a lost mode setting mode. Therefore, after receiving the state change message, the mobile phone 1 may set the lost mode setting identifier to 1, and write the lost mode setting identifier into the secure storage chip, so that the secure storage chip stores the lost mode setting identifier.

It can be understood that the secure storage chip is used as a hardware unit with an independent processor and hardware attack prevention capability, and data stored in the secure storage chip cannot be tampered with or erased through a common ROM flashing or factory settings restoration operation. Therefore, the secure storage chip stores the first account, the service identifier, and the lost mode setting identifier, to prevent an unauthorized person from tampering with or erasing the first account and an anti-theft identifier.

In this embodiment of this application, to increase an anti-theft coefficient of a terminal device, the mobile phone 1 may perform anti-theft in two stages after entering the lost mode. The two stages includes a boot wizard stage and a normally powered-on and running stage. The following separately describes how the mobile phone 1 performs anti-theft in the boot wizard stage and the normally powered-on and running stage.

(1) Boot Wizard Stage

Figure 7:
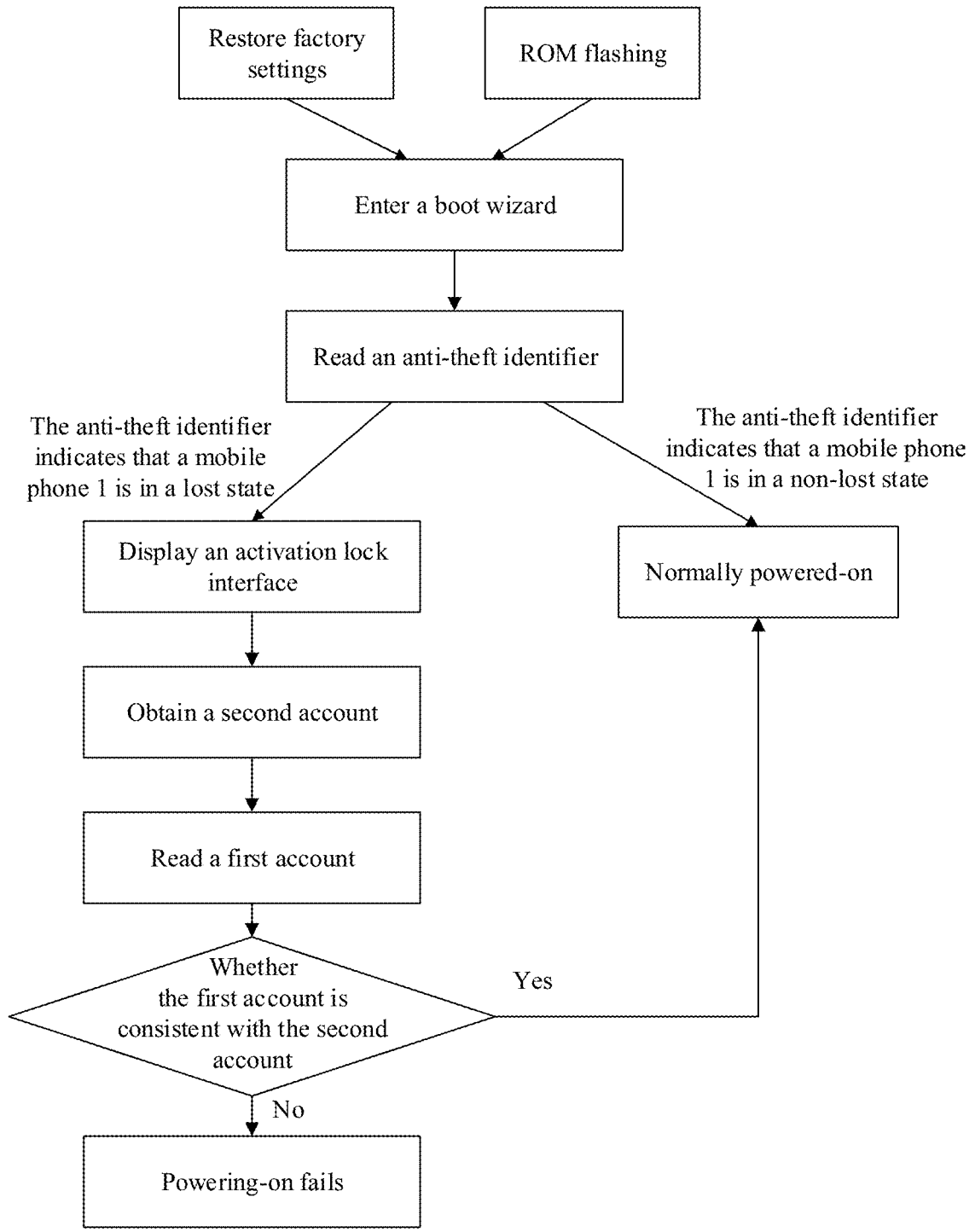
FIG. 7 is a flowchart of a terminal anti-theft method according to this application.

FIG. 7 shows an anti-theft procedure of the mobile phone 1 in the boot wizard stage. The procedure includes: The mobile phone 1 is powered on after factory settings are restored or ROM flashing is performed on the mobile phone 1, and the mobile phone 1 enters a boot wizard. For example, after receiving a power-on operation of the user, the mobile phone 1 may detect whether a firmware version changes. If the firmware version changes, it is considered that ROM flashing is performed on the mobile phone 1, and the mobile phone 1 enters the boot wizard. After entering the boot wizard, the mobile phone 1 may read the anti-theft identifier. If the anti-theft identifier indicates that the mobile phone 1 is not in a lost state, the mobile phone 1 may be directly and normally powered on, to complete factory settings restoration or ROM flashing. If the anti-theft identifier indicates that the mobile phone 1 is in a lost state, the mobile phone 1 may display an activation lock interface (for example, the activation lock interface may be the interface 101 shown in FIG. 1). The mobile phone 1 may identify an input operation of the user in the activation lock interface, and obtain a second account. The mobile phone 1 may read the first account, and learn, through comparison, of whether the first account is consistent with the second account. If the first account is consistent with the second account, the mobile phone 1 is normally powered on; or if the first account is inconsistent with the second account, powering-on of the mobile phone 1 fails, and factory settings restoration or ROM flashing cannot be completed.

In the boot wizard stage, the mobile phone 1 may display different settings interfaces, to guide the user to set a common function. The common function may include WIFI, Contacts, Login account, or the like. After entering the boot wizard, the mobile phone 1 may read the anti-theft identifier, to determine whether the mobile phone 1 is in the lost mode. A procedure in which the mobile phone 1 reads the anti-theft identifier includes: A first CA sends, to a first TA, a request for reading the anti-theft identifier. The first TA receives the request, reads the anti-theft identifier from the secure storage chip, and feeds back the anti-theft identifier to the first CA. The first CA may be an anti-theft CA pre-deployed in an REE, and the first TA is an anti-theft TA pre-deployed in a TEE. The first CA and the first TA cooperate, to implement an anti-theft service of the mobile phone 1. It should be noted that a principle and a procedure of reading the first account by the mobile phone 1 are the same as or similar to a principle and a procedure of reading the anti-theft identifier by the mobile phone 1, and details are not described again below.

Further, the anti-theft identifier includes the service identifier and the lost mode setting identifier. In an optional design, if the service identifier is 1 and the lost mode setting identifier is 1, it may be considered that the mobile phone 1 is in the lost state; or if the lost mode setting identifier is 0 (regardless of whether the service identifier 1 or 0), it may be considered that the mobile phone 1 is not in the lost state. In other words, only after the user enables the Find Device function of the mobile phone 1 and successfully sets the mobile phone 1 to the lost mode, it can be considered that the mobile phone 1 is in the lost state. In this manner, when an original owner normally performs an operation such as ROM flashing on the mobile phone 1, identity verification may not need to be performed. In this way, there is an anti-theft effect, and a case in which poor experience is brought to the user due to a complex operation is further avoided.

In an actual operation, the lost mode can be set only after the Find Device function is enabled. Therefore, if the anti-theft identifier is not modified, and the service identifier is 0, the lost mode setting identifier cannot be 1. In this case, the first CA may first send, to the first TA, a request for reading the service identifier. When it is determined that the service identifier is 1, a request for reading the lost mode setting identifier is sent to the first TA, and whether the mobile phone 1 is in the lost state is further determined based on whether the lost mode setting identifier is 1 or 0.

Figure 8A:
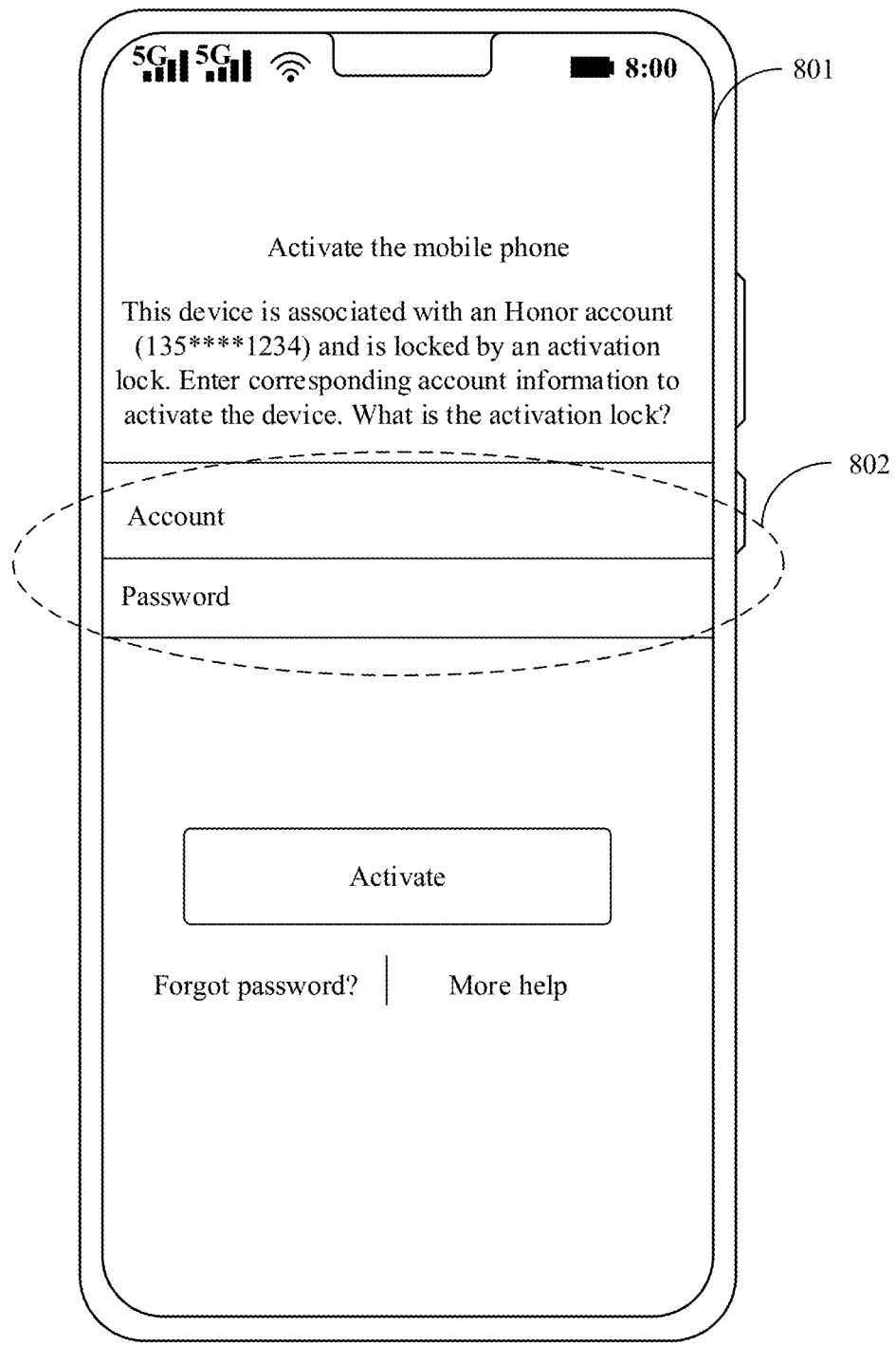
FIG. 8A-FIG. 8B are diagrams of a group of user interfaces according to this application.

After determining that the mobile phone 1 is in the lost state, the mobile phone 1 may display an activation interface. In an optional design, the mobile phone 1 may display an activation interface 801 shown in FIG. 8A. The activation interface 801 may include an input box 802, and the input box 802 is used by the user to enter an account and a password. For example, a touch sensor of the mobile phone 1 detects a touch operation of the user on a display 294, and reports touch location information of the user on the display 294 to a processor 210. The processor 210 determines, based on touch location information reported by the touch sensor in a preset time period, that the touch operation is entering the second account and a corresponding password. After obtaining the second account and the corresponding password that are entered by the user, the mobile phone 1 may verify whether the second account matches the password. If the second account does not match the password, the mobile phone 1 may display prompt information used to notify that the password is incorrect (not shown in the figure). If the second account matches the password, the mobile phone 1 may further learn, through comparison, of whether the first account is consistent with the second account. If the first account is consistent with the second account, the mobile phone 1 is normally powered on; or if the first account is inconsistent with the second account, powering-on of the mobile phone 1 fails, and factory settings restoration or ROM flashing cannot be completed.

Figure 8B:
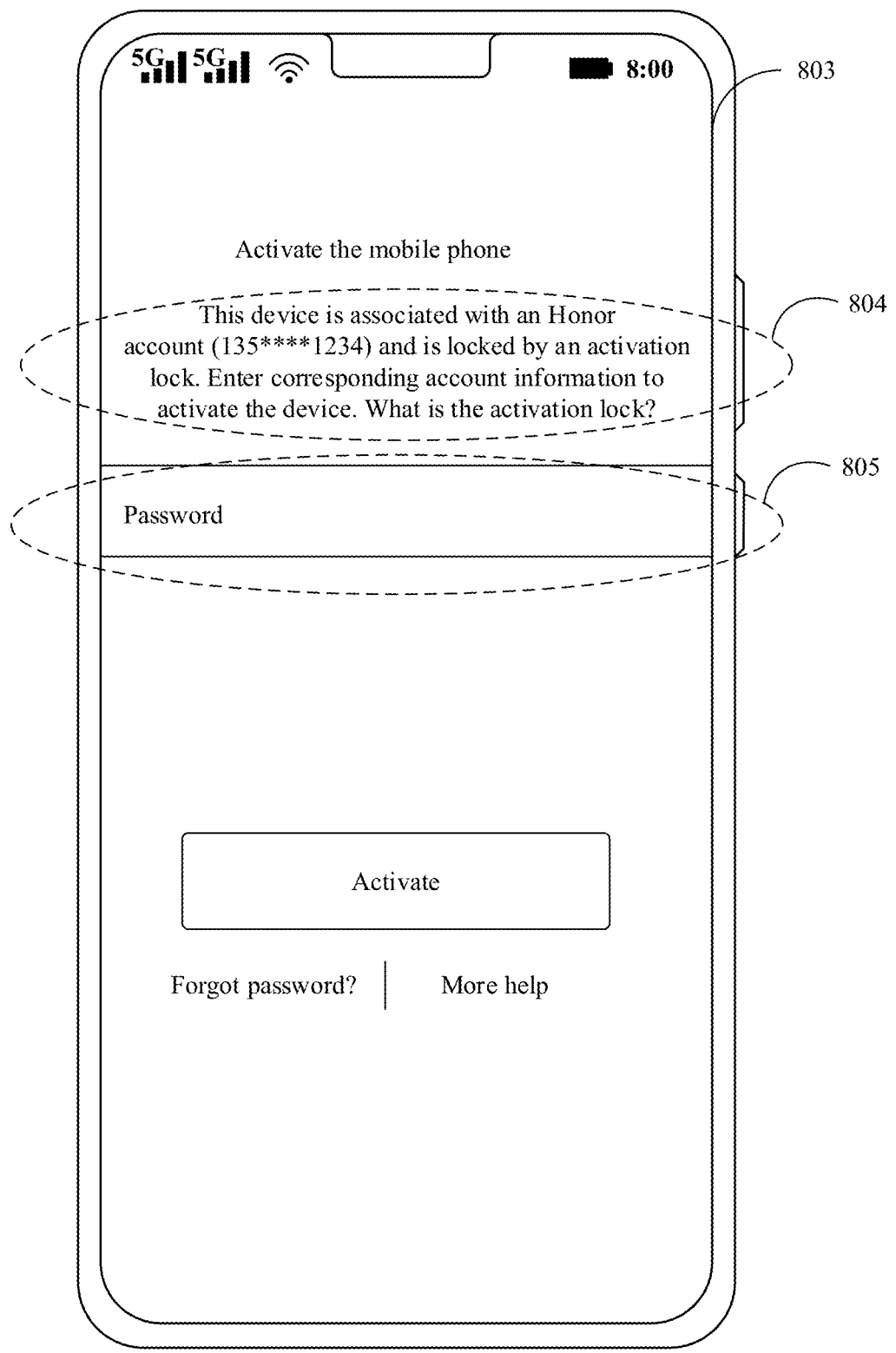

In another optional design, the mobile phone 1 may display an activation interface 803 shown in FIG. 8B. The activation interface 803 may include prompt information 804 and an input box 805. The prompt information 804 is used to notify the user that the device is associated with another account (for example, the first account) and is locked by an activation lock, and a current user needs to enter corresponding account information to activate the device. The input box 805 is used by the user to enter a password of an associated account (the first account). For example, after detecting the password entered by the user, the mobile phone 1 may verify whether the password matches the first account. If the password matches the first account, the mobile phone 1 is normally powered on; or if the password does not match the first account, powering-on of the mobile phone 1 fails, and factory settings restoration or ROM flashing cannot be completed.

In this way, even if the picker performs a ROM flashing or factory settings restoration operation on a picked-up device, after the device is powered on again, the boot wizard stage is entered, and an identity of the user is verified by using the activation lock. If verification does not succeed, the power-on operation cannot be completed, and the picker is prevented from using the mobile phone 1 normally. Therefore, there is an anti-theft effect.

(2) Normally Powered-on and Running Stage.

After the mobile phone 1 is normally powered on and runs, the mobile phone 1 may actively and/or passively start an anti-theft procedure. Actively starting the anti-theft procedure may mean that the mobile phone 1 may periodically read the anti-theft identifier to detect whether the mobile phone 1 is in the lost state. If the mobile phone 1 is in the lost state, a user identity may be verified, and the mobile phone is locked when identity verification fails. A passive anti-theft procedure may mean that when detecting an operation that the user sets a password, the mobile phone 1 may read the anti-theft identifier to detect whether the mobile phone 1 is in the lost state. If the mobile phone 1 is in the lost state, a user identity may be verified, and the mobile phone is locked when identity verification fails.

Figure 9:
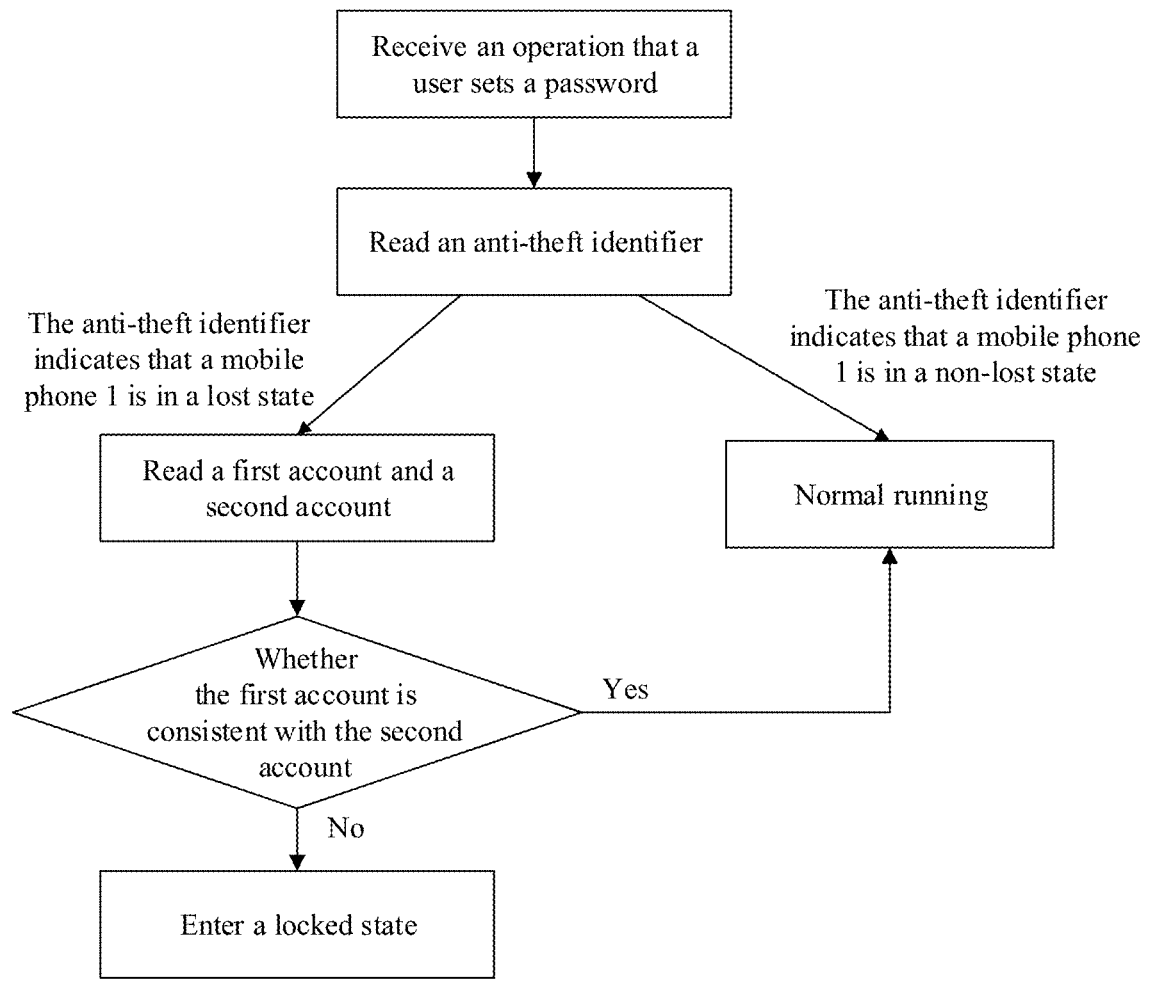
FIG. 9 is a flowchart of a terminal anti-theft method according to this application.

FIG. 9 is a flowchart in which a mobile phone 1 passively starts an anti-theft procedure. As shown in FIG. 9, the mobile phone 1 may receive an operation that the user sets a lock screen password. In response to the operation, the mobile phone 1 may first read the anti-theft identifier. If the anti-theft identifier indicates that the mobile phone 1 is not in the lost state, the mobile phone 1 may run normally. If the anti-theft identifier indicates that the mobile phone 1 is in the lost state, the mobile phone 1 may read the first account and the second account, and verify whether the second account is consistent with the first account. If the first account is consistent with the second account, the mobile phone 1 runs normally; or if the first account is inconsistent with the second account, the mobile phone 1 enters a locked state, and cannot provide a service for the user before being unlocked. In an optional implementation, the anti-theft identifier may include the service identifier and the lost mode setting identifier. When both the service identifier and the lost mode setting identifier are 1, it may be considered that the mobile phone is in the lost state, and the mobile phone 1 reads the first account and the second account.

It should be noted that if an account is logged-in on the mobile phone 1, the mobile phone 1 may directly read the second account. If the second account is not logged-in on the mobile phone 1, the mobile phone 1 may display a login interface, so that the user logs in, to obtain the second account. The login interface is similar to the interface 601 shown in FIG. 5C(1) and FIG. 5C(2), and details are not described herein again. In an optional design, the mobile phone 1 may obtain a login identifier. The login identifier may be used to indicate whether an account is logged-in on the mobile phone 1. For example, the login identifier may be 0 or 1. If the login identifier is 1, it may indicate that an account is logged-in on the mobile phone 1, and if the login identifier is 0, it may indicate that no account is logged-in on the mobile phone 1.

Figure 10A:
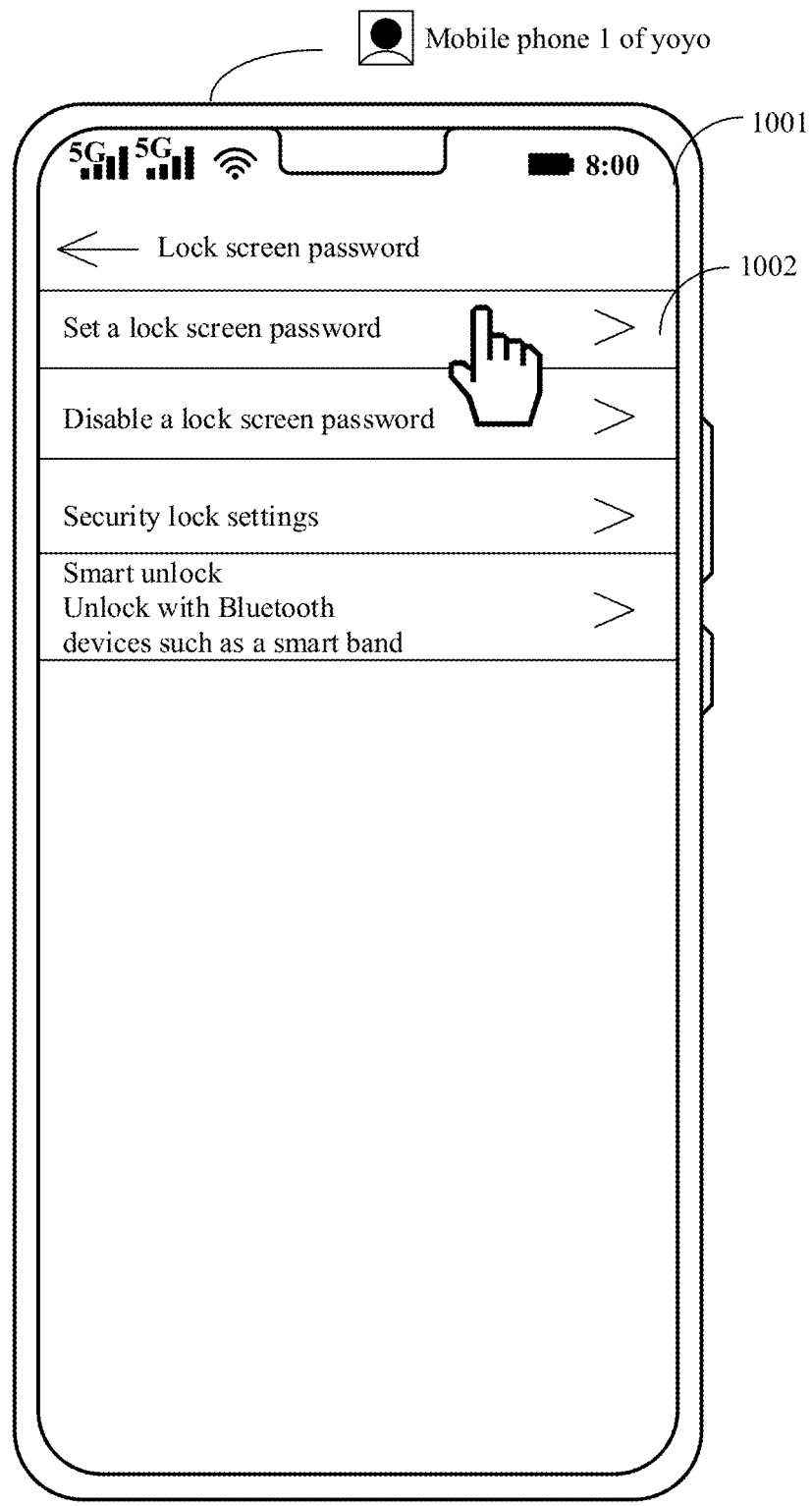
Figure 10B:
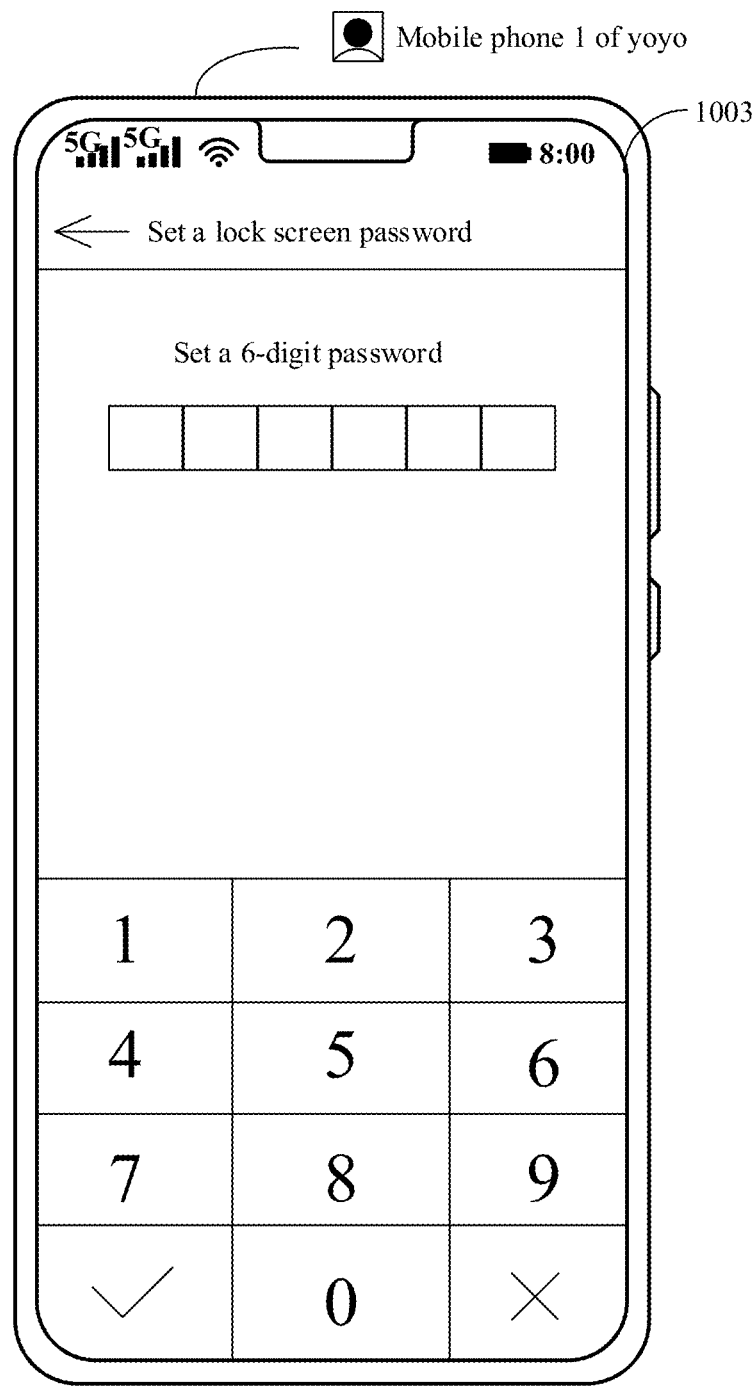

For example, as shown in FIG. 10A, the mobile phone 1 may display an interface 1001 of Lock screen password. The interface 1001 includes an option 1002 of Set a lock screen password. The mobile phone 1 may receive an operation that the user taps the option 1002. In response to the operation, the mobile phone 1 may read the anti-theft identifier. If the anti-theft identifier indicates that the mobile phone 1 is in a non-lost state, or the anti-theft identifier indicates that the mobile phone 1 is in the lost state and the second account is consistent with the first account, the mobile phone 1 may display an interface 1003 shown in FIG. 10B. The interface 1003 is used by the user to set the lock screen password. If the anti-theft identifier indicates that the mobile phone 1 is in the lost state and the second account is inconsistent with the first account, the mobile phone 1 may display an activation lock interface 1004 shown in FIG. 10C(1). The activation lock interface 1004 is used to prompt a current user of the mobile phone 1 to return the mobile phone 1 to the original owner as soon as possible. The mobile phone 1 may receive an operation that the user slides the activation lock interface 1004. In response to the operation, the mobile phone 1 may display an interface 1005 shown in FIG. 10C(2). The interface 1005 is used by the user to enter a password.

It can be understood that because the user pays more attention to privacy, both the original owner of the mobile phone 1 and the picker of the mobile phone 1 may set a lock screen password for the mobile phone 1. Therefore, the lock screen password is set to trigger the mobile phone 1 to verify the anti-theft identifier and the user identity, and the mobile phone is locked when identity verification fails, so that the picker of the mobile phone 1 can be prevented, to some extent, from using the mobile phone 1 normally. Therefore, there is a good anti-theft effect.

It should be noted that the lock screen password is described by using only a digital password as an example.

Actually, the lock screen password may further include biometric recognition information (for example, a fingerprint, a face, or an iris).

Figure 11:
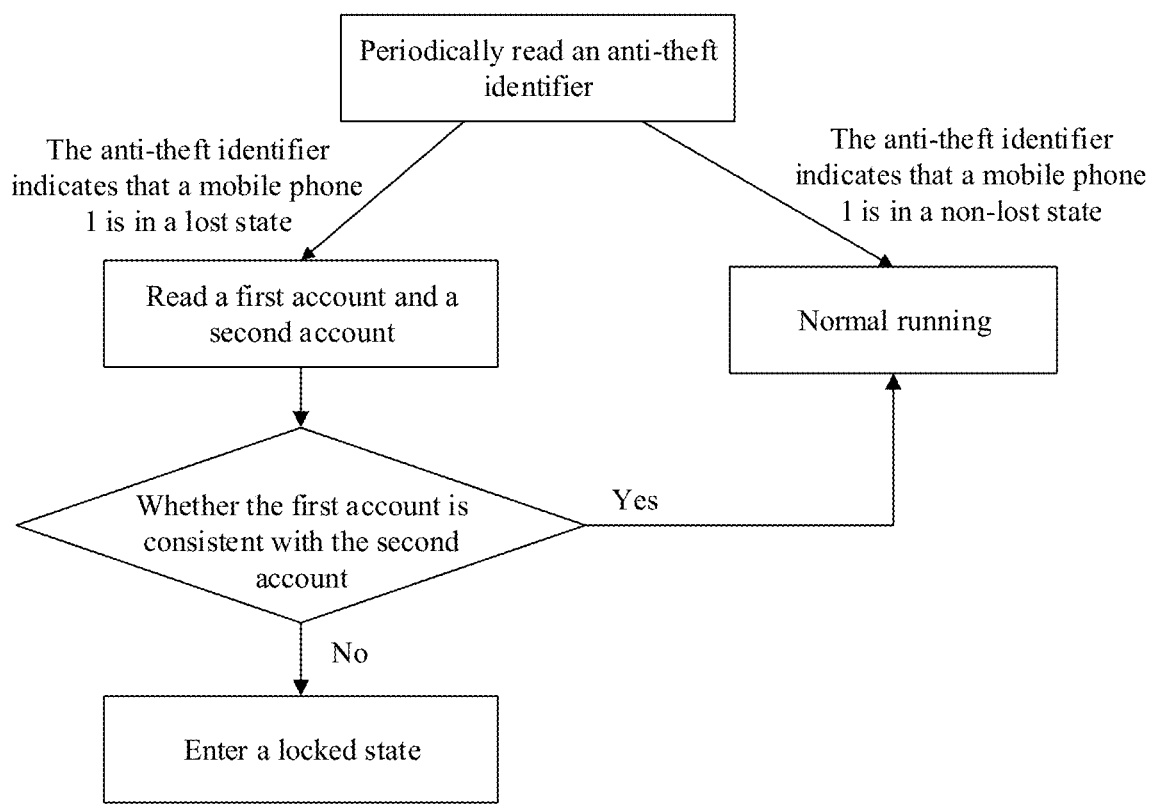
FIG. 11 is a flowchart of a terminal anti-theft method according to this application.

FIG. 11 is a flowchart in which a mobile phone 1 actively starts an anti-theft procedure. As shown in FIG. 11, the mobile phone 1 may periodically read the anti-theft identifier. If the anti-theft identifier indicates that the mobile phone 1 is not in the lost state, the mobile phone 1 may run normally. If the anti-theft identifier indicates that the mobile phone 1 is in the lost state, the mobile phone 1 may read the first account and verify whether the second account is consistent with the first account. If the first account is consistent with the second account, the mobile phone 1 runs normally; or if the first account is inconsistent with the second account, the mobile phone 1 enters the locked state, and cannot provide a service for the user before being unlocked. In an optional implementation, the anti-theft identifier may include the service identifier and the lost mode setting identifier. When both the service identifier and the lost mode setting identifier are 1, it may be considered that the mobile phone is in the lost state, and the mobile phone 1 reads the first account and the second account. If the first account is consistent with the second account, the mobile phone 1 runs normally; or if the first account is inconsistent with the second account, the mobile phone 1 enters a locked state, and cannot provide a service for the user before being unlocked.

It can be understood that, in consideration that some users (including the original owner of the mobile phone 1 and the picker of the mobile phone 1) may not set a lock screen password, an anti-theft procedure triggered by setting a lock screen password cannot achieve an anti-theft effect. Therefore, the mobile phone 1 may further actively and periodically read the anti-theft identifier. Once it is determined that the mobile phone 1 is in the lost state, the user identity needs to be verified, and the mobile phone 1 is locked when identity verification fails. This further increases the anti-theft coefficient of the terminal device.

In this way, even if the picker enables, through some ROM flashing means, the terminal device to be directly powered on without a need to enter the boot wizard stage after ROM flashing is performed on the terminal device, the terminal device may read the anti-theft identifier after the terminal device is powered on normally, and verify the user identity when the anti-theft identifier indicates that the terminal device may be lost. If a verification result is that verification fails, the terminal device enters the locked state. In this case, the user cannot normally use the terminal device. Therefore, there is an anti-theft effect.

It should be noted that, in the anti-theft procedures shown in FIG. 9 and FIG. 11, when determining that the service identifier is 1 and the lost mode setting identifier is 1, the mobile phone 1 may obtain the first account and the second account, and further verify whether the second account is consistent with the first account. In this case, the first CA may first send, to the first TA, the request for reading the service identifier. When it is determined that the service identifier is 1, the request for reading the lost mode setting identifier is sent to the first TA, and whether the mobile phone 1 is in the lost state is further determined based on whether the lost mode setting identifier is 1 or 0. In addition, in this manner, the mobile phone 1 can perform identity verification only after the original owner enables the Find Device function of the mobile phone 1 and sets the mobile phone 1 to the lost mode. In other words, when the original owner does not set the mobile phone 1 to the lost mode, the device may be normally used, and identity verification does not need to be performed. It can be learned that in this manner, there is an anti-theft effect, and a case in which poor experience is brought to the user due to a complex operation can be further avoided.

The foregoing content describes a case in which the mobile phone 1 may perform identity verification on the user in the boot wizard stage or the normally powered-on and running stage after entering the lost mode (that is, the service identifier is 1 and the lost mode setting identifier is 1). In actual application, the original owner of the mobile phone 1 usually does not set the mobile phone 1 to the lost mode in a timely manner (for example, the original owner sets the mobile phone 1 to the lost mode after the picker powers off the mobile phone 1). Consequently, the mobile phone 1 cannot update the lost mode setting identifier in a timely manner, and the anti-theft effect cannot be achieved. Therefore, in an optional design, when the service identifier is 1 (regardless of whether the lost mode setting identifier is 1), it may be considered that the mobile phone 1 is in the lost state. For example, in the boot wizard stage, the mobile phone 1 may display the activation lock interface when determining that the service identifier is 1, and verify the user identity. In a normal running stage, the mobile phone 1 may read the first account and the second account when determining that the service identifier is 1, and further learn, through comparison, of whether the first account is consistent with the second account. It can be learned that after the Find Device function of the mobile phone is enabled, the mobile phone 1 may start the anti-theft procedure, to avoid a problem that the mobile phone 1 does not have an anti-theft effect because the original owner does not set the mobile phone 1 to the lost mode in a timely manner.

In another possible design, when the service identifier is 0, the mobile phone 1 may further display the activation lock interface in the boot wizard stage, to verify the user identity. In other words, even if the Find Device function of the mobile phone 1 is not enabled, the mobile phone 1 may start the anti-theft procedure in the boot wizard stage, so that the anti-theft effect can be achieved to a greatest extent.

In conclusion, in the terminal anti-theft method provided in this application, when the terminal device is lost, whether the second account is consistent with the first account may be verified. If the first account is inconsistent with the second account, the terminal device enters the locked state, and a current user is restricted from continuing using the terminal device. It can be learned that, when the terminal device is powered on and runs, the terminal device may also read the anti-theft identifier and perform identity verification. In this case, even if ROM flashing is performed on the terminal device, the terminal device can be normally used only after identity verification succeeds, to further increase the anti-theft coefficient of the terminal device.

Through the descriptions of the foregoing implementations, a person skilled in the art may clearly understand that, for the purpose of convenient and brief description, only division into the foregoing functional modules is used as an example for description. In actual application, the functions may be allocated to and completed by different functional modules based on a requirement. In other words, an internal structure of an apparatus is divided into different functional modules, to complete all or some of the functions described above. For a specific working process of the system, apparatus, and unit described above, refer to a corresponding process in the foregoing method embodiments. Details are not described herein again.

In the embodiments of this application, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of embodiments of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific implementations of embodiments of this application, but the protection scope of embodiments of this application is not limited thereto. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A terminal anti-theft method, applied to a terminal device, wherein the terminal device comprises a secure storage chip, and the method comprises:
   receiving, by the terminal device, an operation that a user sets a lock screen password of the terminal device;
   in response to the operation, reading, by the terminal device, an anti-theft identifier when the terminal device is directly powered-on and in a running state after Read-Only Memory (ROM) flashing is performed, wherein the anti-theft identifier is stored in the secure storage chip;
   reading, by the terminal device, a first account from the secure storage chip when the anti-theft identifier indicates that the terminal device is in a lost state, wherein the first account is an account associated with the terminal device;
   obtaining, by the terminal device, a second account, wherein the second account is an account that is currently logged-in on the terminal device;
   determining, by the terminal device, whether the first account is consistent with the second account; and
   displaying, by the terminal device, a first interface when the first account is inconsistent with the second account, wherein the first interface indicates that the terminal device is locked.

2. The terminal anti-theft method according to claim 1, wherein setting the lock screen password of the terminal device comprises changing the lock screen password.

3. The terminal anti-theft method according to claim 1, wherein the method further comprises:
   reading, by the terminal device, the anti-theft identifier at a preset time interval.

4. The terminal anti-theft method according to claim 1, wherein the method further comprises:
   reading, by the terminal device, the anti-theft identifier in response to that the terminal device enters a boot wizard.

5. The terminal anti-theft method according to claim 1, wherein the obtaining, by the terminal device, a second account comprises:
   obtaining, by the terminal device, a login identifier;
   displaying, by the terminal device, a second interface if the login identifier indicates that no account is logged-in on the terminal device; and
   obtaining, by the terminal device, the second account in response to an input operation of the user in the second interface.

6. The terminal anti-theft method according to claim 5, wherein the method further comprises:
   reading, by the terminal device, the second account if the login identifier indicates that an account is logged-in on the terminal device.

7. The terminal anti-theft method according to claim 1, wherein the method further comprises:
   displaying, by the terminal device, a third interface in response to receiving an operation that the user slides the first interface, wherein the third interface is used by the user to enter a password that matches the first account.

8. The terminal anti-theft method according to claim 1, wherein the method further comprises:
   resetting, by the terminal device, the anti-theft identifier if the first account is consistent with the second account.

9. The terminal anti-theft method according to claim 1, wherein the anti-theft identifier comprises a first identifier and a second identifier, the first identifier is used to indicate whether a first function of the terminal device is enabled, the first function is a function that the terminal device uploads positioning information to a cloud server in real time, and the second identifier is used to indicate whether the terminal device is set to a lost mode; and
   the terminal device is in a lost state if the first identifier indicates that the first function of the terminal device is enabled; or
   the terminal device is in a lost state if the first identifier indicates that the first function of the terminal device is enabled and the second identifier indicates that the terminal device is set to the lost mode.

10. A terminal device, comprising a secure storage chip, a memory, and a processor, wherein the processor is coupled to the memory, the memory stores program instructions, and when the program instructions stored in the memory are executed by the processor, the terminal device is to implement:
    receiving, by the terminal device, an operation that a user sets a lock screen password of the terminal device;
    in response to the operation, reading, by the terminal device, an anti-theft identifier when the terminal device is directly powered-on and in a running state after Read-Only Memory (ROM) flashing is performed, wherein the anti-theft identifier is stored in the secure storage chip;
    reading, by the terminal device, a first account from the secure storage chip when the anti-theft identifier indicates that the terminal device is in a lost state, wherein the first account is an account associated with the terminal device;
    obtaining, by the terminal device, a second account, wherein the second account is an account that is currently logged-in on the terminal device;

determining, by the terminal device, whether the first account is consistent with the second account; and displaying, by the terminal device, a first interface when the first account is inconsistent with the second account, wherein the first interface indicates that the terminal device is locked.

11. A non-transitory computer-readable storage medium, comprising computer instructions, wherein when the computer instructions are run on a terminal device, the terminal device is to perform:

receiving, by the terminal device, an operation that a user sets a lock screen password of the terminal device;

in response to the operation, reading, by the terminal device, an anti-theft identifier when the terminal device is directly powered-on and in a running state after Read-Only Memory (ROM) flashing is performed, wherein the anti-theft identifier is stored in the secure storage chip;

reading, by the terminal device, a first account from the secure storage chip when the anti-theft identifier indicates that the terminal device is in a lost state, wherein the first account is an account associated with the terminal device;

obtaining, by the terminal device, a second account, wherein the second account is an account that is currently logged-in on the terminal device;

determining, by the terminal device, whether the first account is consistent with the second account; and displaying, by the terminal device, a first interface when the first account is inconsistent with the second account, wherein the first interface indicates that the terminal device is locked.

12. The terminal anti-theft method according to claim 1, wherein the method further comprises:

displaying, by the terminal device, an activation lock interface if the first account is inconsistent with the second account, the activation lock interface comprises a mobile number and a message.

13. The terminal device according to claim 10, wherein setting the lock screen password of the terminal device comprises changing the lock screen password.

14. The terminal device according to claim 10, wherein when the computer instructions are run on the terminal device, the terminal device is to further perform:

reading, by the terminal device, the anti-theft identifier at a preset time interval.

15. The terminal device according to claim 10, wherein the method further comprises:

reading, by the terminal device, the anti-theft identifier in response to that the terminal device enters a boot wizard.

16. The terminal device according to claim 10, wherein the obtaining, by the terminal device, a second account comprises:

obtaining, by the terminal device, a login identifier;

displaying, by the terminal device, a second interface if the login identifier indicates that no account is logged-in on the terminal device; and obtaining, by the terminal device, the second account in response to an input operation of the user in the second interface.

17. The terminal device according to claim 16, when the program instructions stored in the memory are executed by the processor, the terminal device is enabled to further implement:

reading, by the terminal device, the second account if the login identifier indicates that an account is logged-in on the terminal device.

18. The terminal device according to claim 10, when the program instructions stored in the memory are executed by the processor, the terminal device is enabled to further implement:

resetting, by the terminal device, the anti-theft identifier if the first account is consistent with the second account.

19. The terminal device according to claim 10, wherein the anti-theft identifier comprises a first identifier and a second identifier, the first identifier is used to indicate whether a first function of the terminal device is enabled, the first function is a function that the terminal device uploads positioning information to a cloud server in real time, and the second identifier is used to indicate whether the terminal device is set to a lost mode; and the terminal device is in a lost state if the first identifier indicates that the first function of the terminal device is enabled; or the terminal device is in a lost state if the first identifier indicates that the first function of the terminal device is enabled and the second identifier indicates that the terminal device is set to the lost mode.

20. The terminal device according to claim 10, when the program instructions stored in the memory are executed by the processor, the terminal device is enabled to further implement:

displaying, by the terminal device, a third interface in response to receiving an operation that the user slides the first interface, wherein the third interface is used by the user to enter a password that matches the first account.

* * * * *